(12) United States Patent
Yoshino et al.

(10) Patent No.: US 10,856,368 B2
(45) Date of Patent: Dec. 1, 2020

(54) HEATING COOKER SYSTEM, INDUCTIVE HEATING COOKER, AND ELECTRIC APPARATUS

(71) Applicants: Mitsubishi Electric Corporation, Tokyo (JP); Mitsubishi Electric Home Appliance Co., Ltd., Fukaya (JP)

(72) Inventors: Hayato Yoshino, Tokyo (JP); Jun Bunya, Tokyo (JP); Ikuro Suga, Tokyo (JP); Miyuki Takeshita, Tokyo (JP); Kazuhiro Kameoka, Tokyo (JP)

(73) Assignees: Mitsubishi Electric Corporation, Tokyo (JP); Mitsubishi Electric Home Appliance Co., Ltd., Saitama (JP)

( * ) Notice: Subject to any disclaimer, the term of this patent is extended or adjusted under 35 U.S.C. 154(b) by 406 days.

(21) Appl. No.: 15/754,343

(22) PCT Filed: Oct. 16, 2015

(86) PCT No.: PCT/JP2015/079261
§ 371 (c)(1),
(2) Date: Feb. 22, 2018

(87) PCT Pub. No.: WO2017/064803
PCT Pub. Date: Apr. 20, 2017

(65) Prior Publication Data
US 2018/0263084 A1    Sep. 13, 2018

(51) Int. Cl.
*H05B 6/06* (2006.01)
*H05B 6/12* (2006.01)
(Continued)

(52) U.S. Cl.
CPC .......... *H05B 6/062* (2013.01); *A47J 27/004* (2013.01); *A47J 37/0629* (2013.01); *H05B 6/12* (2013.01); *H05B 6/1245* (2013.01); *Y02B 40/00* (2013.01)

(58) Field of Classification Search
CPC ...... H05B 6/062; H05B 6/12; H05B 6/61245; A47J 27/004; A47J 4/0627
(Continued)

(56) References Cited

U.S. PATENT DOCUMENTS

| 8,723,083 B2 * | 5/2014 | Kawata | H05B 6/062 219/209 |
| 2012/0061381 A1 * | 3/2012 | Hashimoto | H05B 6/062 219/620 |

(Continued)

FOREIGN PATENT DOCUMENTS

| CN | 1107634 A | 8/1995 |
| CN | 102884863 A | 1/2013 |

(Continued)

OTHER PUBLICATIONS

Office Action dated Sep. 25, 2019 issued in corresponding KR patent application No. 10-2018-7006820 (and English translation).
(Continued)

*Primary Examiner* — Huyen D Le
(74) *Attorney, Agent, or Firm* — Posz Law Group, PLC

(57) ABSTRACT

A heating cooker system includes a first coil configured to produce a first high-frequency magnetic field by receiving supply of a first high-frequency current, a first inverter circuit configured to supply the first high-frequency current to the first coil, a first heating element positioned in reach of the first high-frequency magnetic field produced by the first coil to be inductively heated by the first coil, a second coil configured to produce a second high-frequency magnetic field by receiving supply of a second high-frequency current, a second inverter circuit configured to supply the second high-frequency current to the second coil, a power receiving coil positioned in reach of the second high-frequency magnetic field produced by the second coil to receive electric power from the second coil, and a second (Continued)

heating element configured to generate heat by the electric power received by the power receiving coil.

13 Claims, 11 Drawing Sheets

(51) Int. Cl.
    *A47J 37/06*     (2006.01)
    *A47J 27/00*     (2006.01)

(58) Field of Classification Search
    USPC ........................................................ 219/620
    See application file for complete search history.

(56) References Cited

U.S. PATENT DOCUMENTS

| | | | | |
|---|---|---|---|---|
| 2015/0114953 | A1* | 4/2015 | Suzuki | H05B 6/1254 219/620 |
| 2019/0131824 | A1* | 5/2019 | Suga | H05B 6/062 |
| 2020/0021136 | A1* | 1/2020 | Suga | H02J 50/70 |

FOREIGN PATENT DOCUMENTS

| | | |
|---|---|---|
| EP | 2 600 692 A1 | 6/2013 |
| EP | 2 959 810 A1 | 12/2015 |
| JP | H04-341790 A | 11/1992 |
| JP | H05-040853 Y2 | 10/1993 |
| JP | H07-263132 A | 10/1995 |
| JP | H07-318075 A | 12/1995 |
| JP | H08-315975 A | 11/1996 |
| JP | 2005-190910 A | 7/2005 |
| JP | 2006-278150 A | 10/2006 |
| JP | 2010-262751 A | 11/2010 |
| JP | 2011-004795 A | 1/2011 |
| JP | 2011-033313 A | 2/2011 |
| JP | 2011-113948 A | 6/2011 |
| JP | 2012-104261 A | 5/2012 |
| JP | 2012-113975 A | 6/2012 |
| JP | 2013-058331 A | 3/2013 |
| JP | 2014-154533 A | 8/2014 |
| KR | 10-2005-0056055 A | 6/2005 |
| KR | 10-2007-0066429 A | 6/2007 |
| WO | 2014/129208 A1 | 8/2014 |

OTHER PUBLICATIONS

Office Action dated Oct. 1, 2019 issued in corresponding JP patent application No. 2017-545063 (and English translation).
Office Action dated Feb. 28, 2019 issued in corresponding KR patent application No. 10-2018-7006820 (and English translation).
Office Action dated Mar. 5, 2019 issued in corresponding JP patent application No. 2017-545063 (and English translation).
Office Action dated Jul. 27, 2018 in the corresponding AU patent application No. 2015411672.
International Search Report of the International Searching Authority dated Dec. 28, 2015 for the corresponding International application No. PCT/JP2015/079261 (and English translation).
Office Action dated May 26, 2020 issued in corresponding CN patent application No. 201580083751.7 (and English translation).
Office Action dated Mar. 30, 2020 issued in corresponding KR patent application No. 10-2018-7006820 (and English translation).

* cited by examiner

HEATING COOKER SYSTEM, INDUCTIVE HEATING COOKER, AND ELECTRIC APPARATUS

CROSS REFERENCE TO RELATED APPLICATION

This application is a U.S. national stage application of PCT/JP2015/079261 filed on Oct. 16, 2015, the contents of which are incorporated herein by reference.

TECHNICAL FIELD

The present invention relates to a heating cooker system, an inductive heating cooker, and an electric apparatus using inductive heating and heating through non-contact power transmission.

BACKGROUND ART

A high-frequency inductive heating cooker including an inductive heating coil that inductively heats a cooking container, a power receiving coil that is electromagnetically induced by a power feeding coil, and a heating unit that is supplied with power by the power receiving coil, and in which the inductive heating coil and the power feeding coil share a power supply unit has been proposed (see Patent Literature 1, for example).

CITATION LIST

Patent Literature

Patent Literature 1: Japanese Unexamined Patent Application Publication No. 4-341790

SUMMARY OF INVENTION

Technical Problem

The conventional high-frequency inductive heating cooker uses the same power supply unit to supply power to the heating coil and the power feeding coil. That is, in the conventional high-frequency inductive heating cooker, a coil switching relay alternately switches between supply of power to the inductive heating coil from the power supply unit and supply of power to the power feeding coil from the power supply unit. This raises an issue that inductive heating with the inductive heating coil and heating with electric power received from the power feeding coil through non-contact power transmission are not simultaneously executable.

Further, in the conventional high-frequency inductive heating cooker, the inductive heating coil and the power feeding coil are connected in series to supply power to the inductive heating coil and the power feeding coil from the single power supply unit. This raises an issue that the heating through inductive heating and the heating through non-contact power transmission are not independently controllable.

The present invention has been made to address the above-described issues, and an object of the present invention is to obtain a heating cooker system, an inductive heating cooker, and an electric apparatus capable of simultaneously and independently controlling the heating through inductive heating and the heating through non-contact power transmission.

Solution to Problem

A heating cooker system according to an embodiment of the present invention includes a first coil configured to produce a first high-frequency magnetic field by receiving supply of a first high-frequency current; a first inverter circuit configured to supply the first high-frequency current to the first coil; a first heating element positioned in reach of the first high-frequency magnetic field produced by the first coil to be inductively heated by the first coil; a second coil configured to produce a second high-frequency magnetic field by receiving supply of a second high-frequency current; a second inverter circuit provided independently of the first inverter circuit and configured to supply the second high-frequency current to the second coil; a power receiving coil positioned in reach of the second high-frequency magnetic field produced by the second coil to receive electric power from the second coil; and a second heating element configured to generate heat by the electric power received by the power receiving coil.

Advantageous Effects of Invention

The heating cooker system according to the embodiment of the present invention includes the first inverter circuit, which supplies the first high-frequency current to the first coil that inductively heats the first heating element, and the second inverter circuit, which supplies the second high-frequency current to the second coil that transmits the electric power to the power receiving coil.

Accordingly, the heating through inductive heating and the heating through non-contact power transmission are simultaneously executable. Further, the heating through inductive heating and the heating through non-contact power transmission are independently controllable.

DESCRIPTION OF EMBODIMENTS

Embodiment 1

(Configuration)

Figure 1:
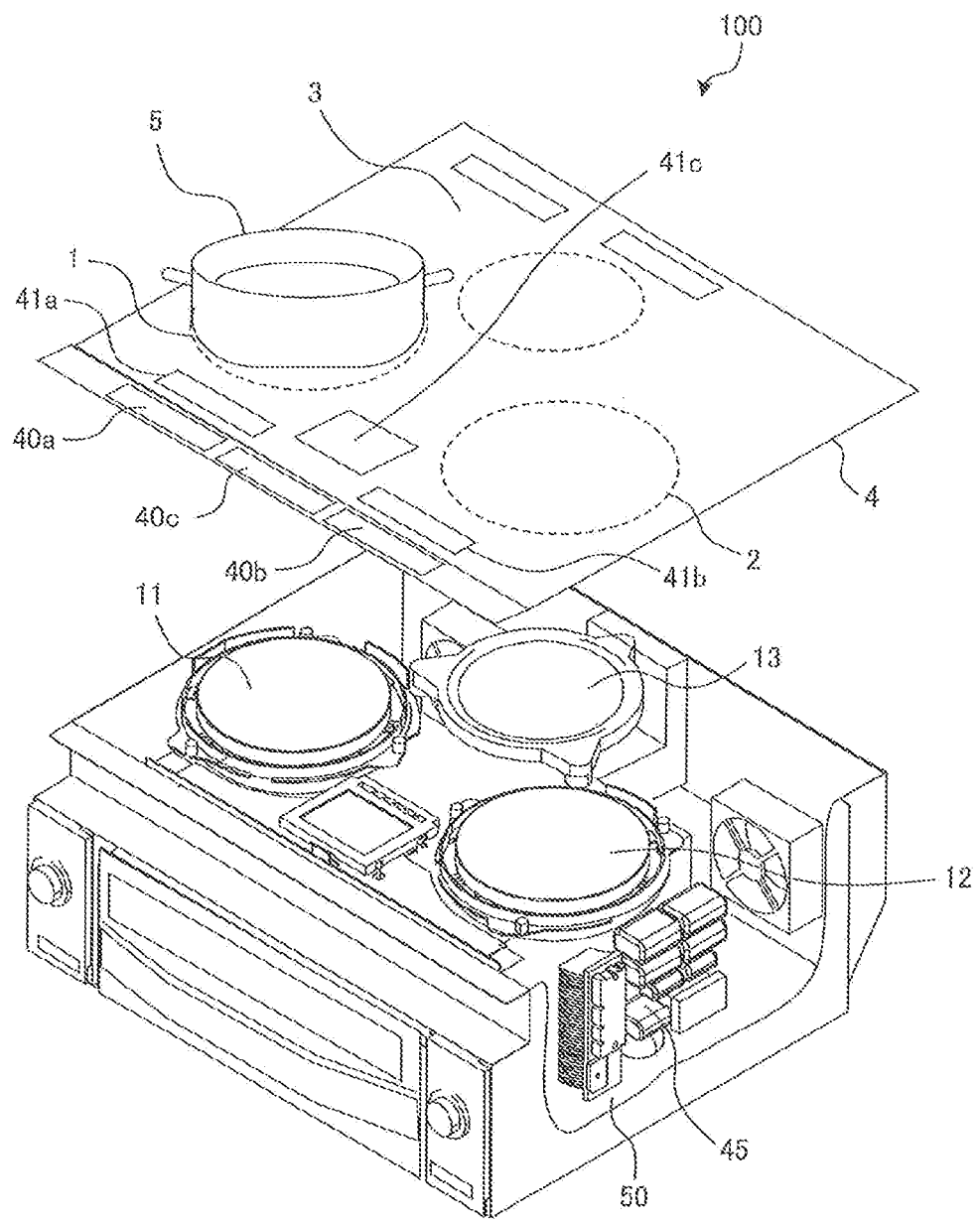
FIG. 1 is an exploded perspective view illustrating a main body of an inductive heating cooker in a heating cooker system according to Embodiment 1.

FIG. 1 is an exploded perspective view illustrating a main body of an inductive heating cooker in a heating cooker system according to Embodiment 1.

As illustrated in FIG. 1, an upper portion of a main body 100 of the inductive heating cooker includes a top plate 4 on which a load, such as a heating target 5 like a pot or an electric apparatus 200, is placed. With FIG. 1, a description will be given of an example in which the heating target 5 is placed as the load. The top plate 4 includes a first heating area 1, a second heating area 2, and a third heating area 3 as heating areas for inductively heating the heating target 5. Corresponding to the respective heating areas, a first heating unit 11, a second heating unit 12, and a third heating unit 13 are provided to enable inductive heating of the heating target 5 placed on one of the heating areas.

In Embodiment 1, the first heating unit 11 and the second heating unit 12 are provided to be laterally aligned on the front side of the main body, and the third heating unit 13 is provided substantially at the center of the main body on the rear side of the main body.

The arrangement of the heating areas is not limited thereto. For example, the three heating areas may be arranged to be aligned laterally in a substantially linear manner. Further, the first heating unit 11 and the second heating unit 12 may be arranged such that the respective centers thereof are different in position in the depth direction.

The whole of top plate 4 is entirely made of an infrared transmitting material, such as heat-resistant reinforced glass or crystallized glass, and is watertightly fixed to an outer circumference of an upper opening of the main body 100 of the inductive heating cooker via a rubber packing or sealing material. On the top plate 4, circular pot position marks roughly indicating pot placement positions are formed by painting or printing, for example, corresponding to respective heating ranges (the heating areas) of the first heating unit 11, the second heating unit 12, and the third heating unit 13.

The front side of the top plate 4 is provided with an operation unit 40a, an operation unit 40b, and an operation unit 40c (hereinafter occasionally collectively referred to as the operation units 40) each as an input device for setting heating power to be input (electric power to be input) and a cooking menu (such as boiling mode, frying mode, or electric apparatus heating mode) when heating the heating target 5 with the corresponding one of the first heating unit 11, the second heating unit 12, and the third heating unit 13. Further, a display unit 41a, a display unit 41b, and a display unit 41c for displaying information such as the operating state of the main body 100 and details of inputs and operations from the operation units 40 are provided near the operation units 40 as reporting units 42.

The configurations of the operation units 40a to 40c and the display units 41a to 41c are not particularly limited. For example, the operation units 40a to 40c and the display units 41a to 41c may be provided for the respective heating areas, or an operation unit 40 and a display unit 41 may be provided for the heating areas as a whole. The operation units 40a to 40c are formed of mechanical switches, such as push switches or tactile switches, or touch switches that detect an input operation based on a change in capacitance of an electrode, for example. Further, the display units 41a to 41c are formed of liquid crystal devices (LCDs) or LEDs, for example.

The following description will be given of a case in which a display-and-operation unit 43 configured to integrate the operation units 40 and the display units 41 is provided. The display-and-operation unit 43 is formed of a touch panel having touch switches arranged on an upper surface of an LCD, for example.

Under the top plate 4, the main body 100 includes therein the first heating unit 11, the second heating unit 12, and the third heating unit 13, each of which is formed of coils.

At least one of the first heating unit 11, the second heating unit 12, and the third heating unit 13 may be formed of a type of electric heater that performs heating by radiation, for example (a nichrome wire, a halogen heater, or a radiant heater, for instance).

Each of the coils is formed by winding a conductive wire made of a given metal (copper or aluminum, for example) coated with an insulating film. Each of the coils is supplied with high-frequency power by a drive circuit 50, and thereby produces a high-frequency magnetic field.

The main body 100 of the inductive heating cooker includes therein drive circuits 50, which supply high-frequency power to the coils of the first heating unit 11, the second heating unit 12, and the third heating unit 13, and a control unit 45 for controlling the operation of the entire inductive heating cooker including the drive circuits 50.

Figure 2:
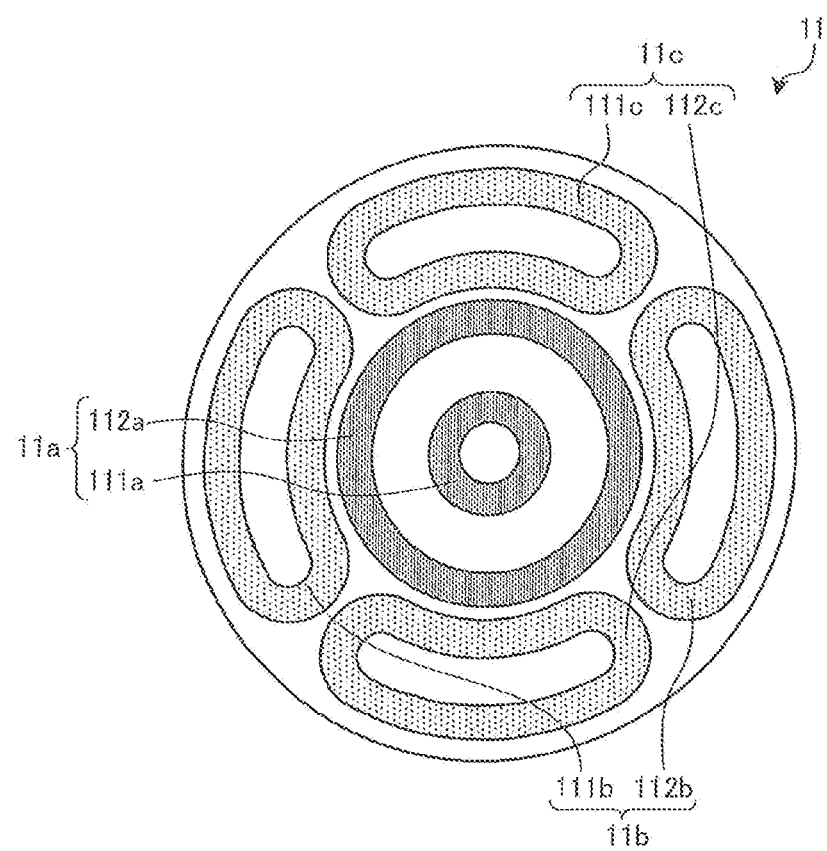
FIG. 2 is a diagram illustrating a first heating unit of the inductive heating cooker according to Embodiment 1.

FIG. 2 is a diagram illustrating the first heating unit of the inductive heating cooker according to Embodiment 1.

In FIG. 2, the first heating unit 11 is formed of an inner circumferential coil 11a positioned at the center thereof and outer circumferential coils 11b and 11c positioned around the inner circumferential coil 11a. The outer circumference of the first heating unit 11 has a substantially circular shape corresponding to the first heating area 1.

The inner circumferential coil 11a is formed of an inner circumferential inner coil 111a and an inner circumferential outer coil 112a, which are positioned substantially concentrically with each other. Each of the inner circumferential inner coil 111a and the inner circumferential outer coil 112a has a circular plane shape, and is formed of a conductive wire made of a given metal (copper or aluminum, for example) coated with an insulating film and wound in the circumferential direction. The inner circumferential inner coil 111a and the inner circumferential outer coil 112a are connected in series and subjected to drive control of one of the drive circuits 50. The inner circumferential inner coil 111a and the inner circumferential outer coil 112a may be connected in parallel, and may respectively be driven with independent drive circuits (inverter circuits).

The outer circumferential coil 11b is formed of an outer circumferential left coil 111b and an outer circumferential right coil 112b. The outer circumferential coil 11c is formed of an outer circumferential upper coil 111c and an outer circumferential lower coil 112c. The outer circumferential left coil 111b and the outer circumferential right coil 112b are connected in series and subjected to drive control of one of the drive circuits 50. Further, the outer circumferential upper coil 111c and the outer circumferential lower coil 112c are connected in series and subjected to drive control of one of the drive circuits 50.

The outer circumferential left coil 111b, the outer circumferential right coil 112b, the outer circumferential upper coil 111c, and the outer circumferential lower coil 112c (hereinafter also referred to as "the outer circumferential coils") are positioned around the inner circumferential coil 11a to substantially follow a circular outer shape of the inner circumferential coil 11a.

Each of the four outer circumferential coils has a substantially quarter arcuate shape (banana or cucumber shape) in a plan view, and is formed of a conductive wire made of a given metal (copper or aluminum, for example) coated with an insulating film and wound along the quarter arcuate shape of the outer circumferential coil. That is, each of the outer circumferential coils is formed to extend substantially along the circular plane shape of the inner circumferential coil 11a in a quarter arc-shaped area adjacent to the inner circumferential coil 11a. The number of the outer circumferential coils is not limited to four. Further, the shape of each of the outer circumferential coils is not limited to the above-described one. For example, a configuration using a plurality of circular outer coils may be employed.

Figure 3:
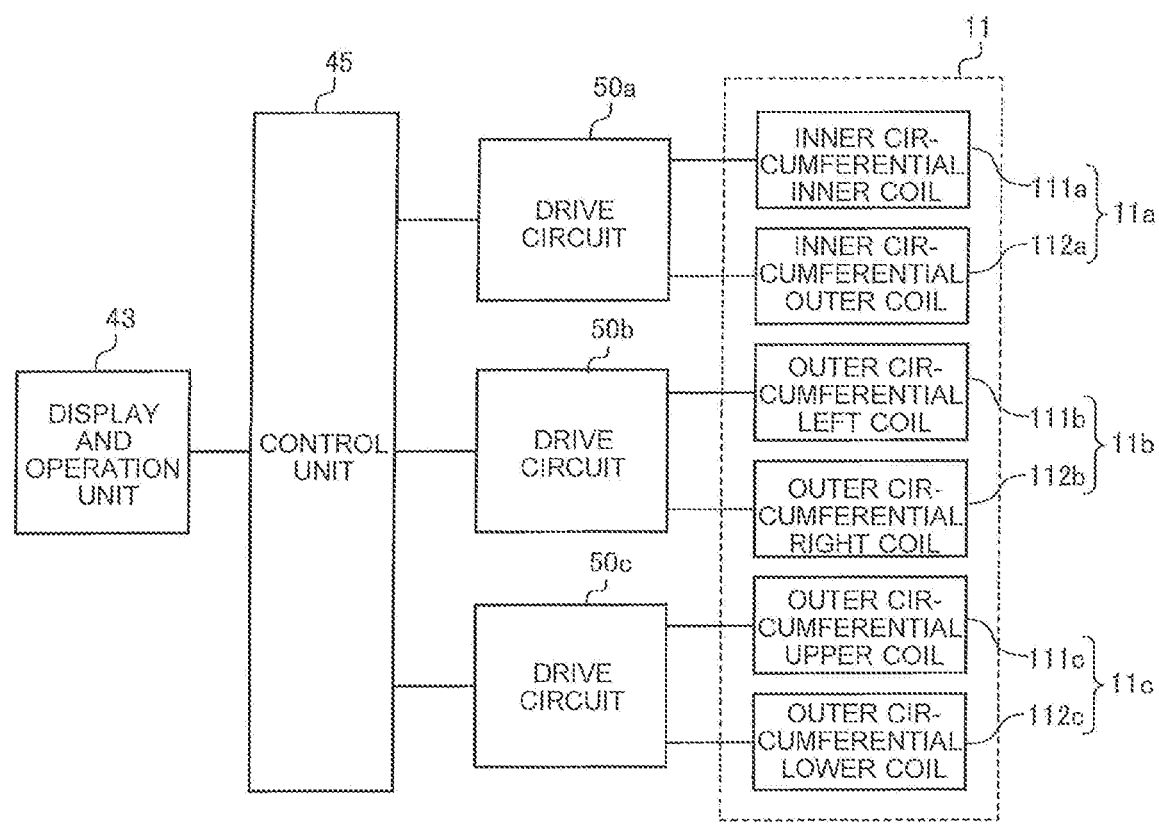
FIG. 3 is a block diagram illustrating drive circuits of the first heating unit of the inductive heating cooker according to Embodiment 1.

FIG. 3 is a block diagram illustrating the drive circuits of the first heating unit of the inductive heating cooker according to Embodiment 1.

As illustrated in FIG. 3, the first heating unit 11 is subjected to drive control of drive circuits 50a, 50b, and 50c. That is, the inner circumferential inner coil 111a and the inner circumferential outer coil 112a forming the inner circumferential coil 11a are subjected to drive control of the drive circuit 50a. Further, the outer circumferential left coil 111b and the outer circumferential right coil 112b forming the outer circumferential coil 11b are subjected to drive control of the drive circuit 50b. Further, the outer circumferential upper coil 111c and the outer circumferential lower coil 112c forming the outer circumferential coil 11c are subjected to drive control of the drive circuit 50c.

The control unit 45 is formed of a device such as a microcomputer or a digital signal processor (DSP). Based on information such as details of operations of the display-and-operation unit 43, the control unit 45 controls each of the drive circuits 50a, 50b, and 50c. The control unit 45 further displays information on the display-and-operation unit 43 in accordance with factors such as the operating state.

Figure 4:
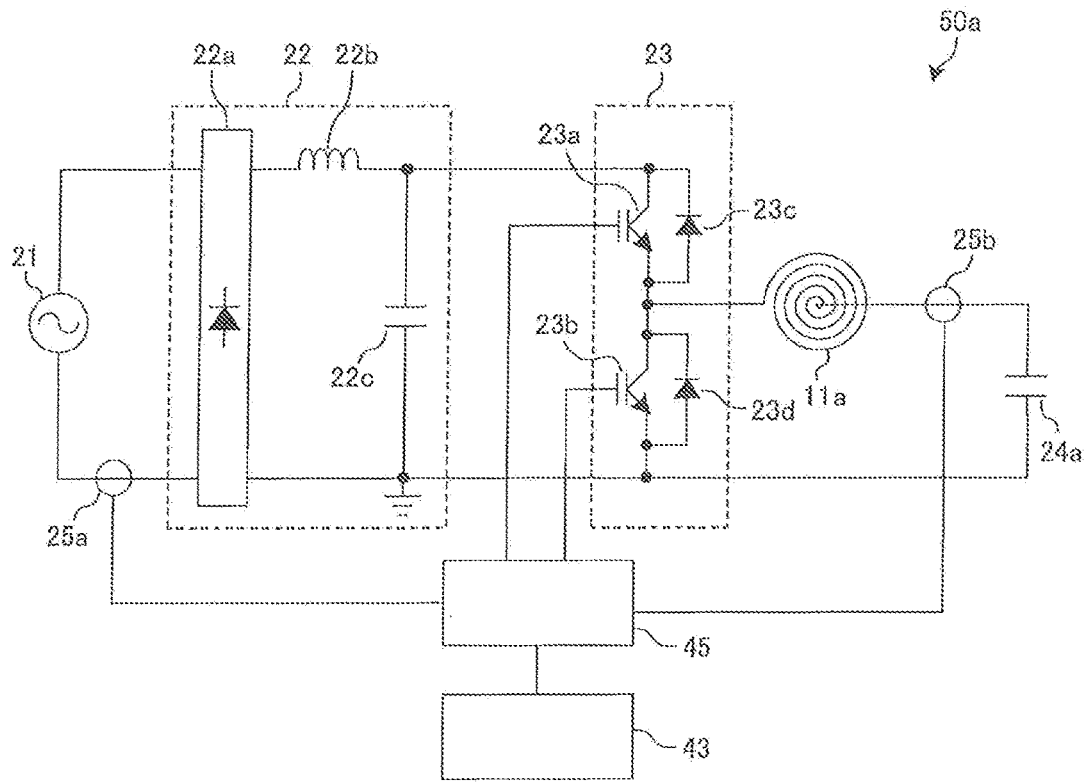
FIG. 4 is a diagram illustrating one of the drive circuits of the inductive heating cooker according to Embodiment 1.

FIG. 4 is a diagram illustrating one of the drive circuits of the inductive heating cooker according to Embodiment 1. The drive circuits 50, which are provided for the respective heating units, may have the same circuit configuration, or may have different circuit configurations for the respective heating units. FIG. 4 illustrates the drive circuit 50a that drives the inner circumferential coil 11a.

As illustrated in FIG. 4, the drive circuit 50a includes a direct-current power supply circuit 22, an inverter circuit 23, and a resonant capacitor 24a.

An input current detecting unit 25a, which is formed of a current sensor, for example, detects a current input to the direct-current power supply circuit 22 from an alternating-current power supply (commercial power supply) 21, and outputs a voltage signal corresponding to the value of the input current to the control unit 45.

The direct-current power supply circuit 22, which includes a diode bridge 22a, a reactor 22b, and a smoothing capacitor 22c, converts an alternating-current voltage input thereto from the alternating-current power supply 21 into a direct-current voltage, and outputs the direct-current voltage to the inverter circuit 23.

The inverter circuit 23 is a so-called half-bridge inverter, in which IGBTs 23a and 23b serving as switching elements are connected in series with outputs of the direct-current power supply circuit 22, and diodes 23c and 23d are connected in parallel with the IGBTs 23a and 23b, respectively, as flywheel diodes. The IGBTs 23a and 23b are driven on and off by a drive signal output from the control unit 45. The control unit 45 outputs the drive signal, which alternately turns on and off the IGBTs 23a and 23b by placing the IGBT 23b in the OFF state when the IGBT 23a is turned on and placing the IGBT 23b in the ON state when the IGBT 23a is turned off. Thereby, the inverter circuit 23 converts the direct-current power output from the direct-current power supply circuit 22 into alternating-current power having a high frequency ranging from approximately 20 kHz to approximately 100 kHz, and supplies the power to a resonant circuit formed of the inner circumferential coil 11a and the resonant capacitor 24a.

With the resonant capacitor 24a connected in series with the inner circumferential coil 11a, the resonant circuit has a resonant frequency according to factors such as the inductance of the inner circumferential coil 11a and the capacitance of the resonant capacitor 24a. When magnetic coupling with the heating target 5 (a metal load) occurs, the inductance of the inner circumferential coil 11a changes in accordance with characteristics of the metal load, and the resonant frequency of the resonant circuit changes in accordance with the change in the inductance.

With this configuration, a high-frequency current of approximately tens of amperes flows through the inner circumferential coil 11a, and the heating target 5 placed on a part of the top plate 4 immediately above the inner circumferential coil 11a is inductively heated by a high-frequency magnetic flux produced by the flowing high-frequency current. Each of the IGBTs 23a and 23b serving as a switching element is formed with a semiconductor made of a silicon-based material, for example, but may be formed with a wideband gap semiconductor made of a material such as a silicon carbide-based material or a gallium nitride-based material.

With the use of the wideband gap semiconductor for the switching element, it is possible to reduce power supply loss of the switching element, and realize favorable heat transfer from the drive circuit even if the switching frequency (driving frequency) is increased to a high frequency (high speed). Accordingly, it is possible to reduce the size of heat transfer fins of the drive circuit, and thus to reduce the size and cost of the drive circuit.

A coil current detecting unit 25b is connected to the resonant circuit formed of the inner circumferential coil 11a and the resonant capacitor 24a. The coil current detecting unit 25b, which is formed of a current sensor, for example, detects the current flowing through the inner circumferential coil 11a and outputs a voltage signal corresponding to the value of the coil current to the control unit 45.

The drive circuit 50a that drives the inner circumferential coil 11a has been described with FIG. 4. A configuration similar to the configuration of the drive circuit 50a is also applicable to the drive circuit 50b that drives the outer circumferential coil 11b and the drive circuit 50c that drives the outer circumferential coil 11c. The drive circuits 50a, 50b, and 50c may be connected in parallel with the alternating-current power supply 21.

Figure 5:
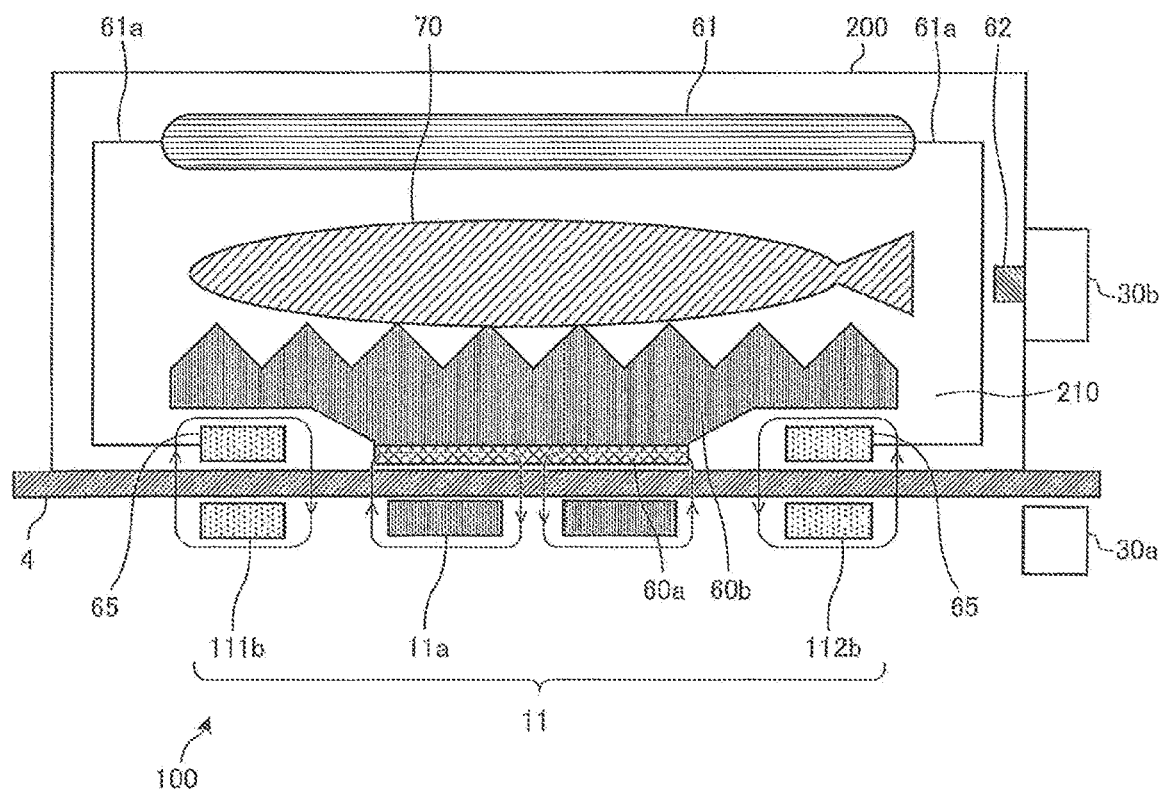
FIG. 5 is a block diagram illustrating a configuration of the main body of the inductive heating cooker and an electric apparatus in the heating cooker system according to Embodiment 1.

FIG. 5 is a block diagram illustrating a configuration of the main body of the inductive heating cooker and the electric apparatus in the heating cooker system according to Embodiment 1.

In FIG. 5, the heating cooker system includes the main body 100 of the inductive heating cooker and the electric apparatus 200. FIG. 5 illustrates a state in which the electric apparatus 200 is placed on the top plate 4 of the main body 100. Further, FIG. 5 schematically illustrates a longitudinal section of the main body 100 and the electric apparatus 200 viewed from a front surface side thereof in a state in which the electric apparatus 200 is placed on the first heating unit 11.

In FIG. 5, the main body 100 includes the inner circumferential coil 11a and the outer circumferential coil 11b (the outer circumferential left coil 111b and the outer circumferential right coil 112b) positioned under the top plate 4. Illustration of the outer circumferential upper coil 111c and the outer circumferential lower coil 112c forming the outer circumferential coil 11c is omitted in FIG. 5. In FIG. 5, arrows illustrated around the inner circumferential coil 11a and a magnetic member 60a, arrows illustrated around the outer circumferential left coil 111b and a power receiving coil 65, and arrows illustrated around the outer circumferential right coil 112b and a power receiving coil 65 indicate magnetic flux lines.

The main body 100 is provided with a first transmitting and receiving unit 30a that communicates with the electric apparatus 200. The first transmitting and receiving unit 30a is formed of a wireless communication interface conforming to a given communication standard, such as Wi-Fi (registered trademark), Bluetooth (registered trademark), infrared communication, or near field communication (NFC), for example. The first transmitting and receiving unit 30a bidirectionally communicates information with a second transmitting and receiving unit 30b of the electric apparatus 200.

The electric apparatus 200 is an apparatus that cooks a food 70, such as fish, for example. The electric apparatus 200 is placed on the top plate 4 of the main body 100. A heating chamber 210 for storing the food 70 is formed in a housing of the electric apparatus 200. The electric apparatus 200 includes the magnetic member 60a, a cooking tray 60b, an upper heater 61, a temperature sensor 62, power receiving coils 65, and the second transmitting and receiving unit 30b.

The magnetic member 60a is made of a magnetic material, such as iron, for example, and is positioned on a bottom surface of the electric apparatus 200.

The cooking tray 60b has an upper surface having corrugated irregularities, for example, and the food 70, such as fish, for example, is placed on the upper surface. The cooking tray 60b is positioned in contact with an upper surface of the magnetic member 60a, for example, and the food 70 is placed on the cooking tray 60b. The cooking tray 60b is made of a non-magnetic metal, such as aluminum, for example, and is thermally coupled (joined) with the magnetic member 60a. The position of the cooking tray 60b is not limited to the upper surface of the magnetic member 60a, and it suffices if the cooking tray 60b is disposed at a position to which the heat from the magnetic member 60a is transferred.

The power receiving coils 65 are positioned on the bottom surface of the electric apparatus 200. Each of the power receiving coils 65 is formed of a conductive wire made of a given metal (copper or aluminum, for example) coated with an insulating film and wound in the circumferential direction. When positioned in reach of a high-frequency magnetic field produced by the outer circumferential coil 11b in the main body 100, the power receiving coil 65 receives electric power through electromagnetic induction or magnetic field resonance.

The upper heater 61 is connected to the power receiving coils 65 by wires 61a. The upper heater 61 is formed of a heating element that generates heat by the electric power received by the power receiving coils 65. For example, a sheathed heater being a resistance heating element is employed as the upper heater 61. A specific configuration of the upper heater 61 is not limited thereto, and a given heating element such as a halogen heater or a far-infrared heater may be employed.

The temperature sensor 62 is positioned in the heating chamber 210 to detect the temperature in the heating chamber 210. For example, a platinum resistance temperature detector, a thermistor, or a thermocouple is employed as the temperature sensor 62. A plurality of temperature sensors 62 may be provided as necessary. Further, the temperature sensor 62 is not necessarily positioned on a wall surface of the heating chamber 210, and may be provided on a top surface or a bottom surface of the heating chamber 210 or on the cooking tray 60b as necessary. Further, a non-contact temperature sensor 62 may be provided which detects the amount of infrared rays radiated from the food 70 to detect the surface temperature of the food 70.

The second transmitting and receiving unit 30b is formed of a wireless communication interface conforming to the communication standard of the first transmitting and receiving unit 30a. The second transmitting and receiving unit 30b bidirectionally communicates information with the first transmitting and receiving unit 30a of the main body 100. The second transmitting and receiving unit 30b transmits to the first transmitting and receiving unit 30a information such as the information of the temperature detected by the temperature sensor 62, information uniquely added to the electric apparatus 200, information indicating the apparatus type of the electric apparatus 200, and information related to apparatus specifications of the electric apparatus 200.

The magnetic member 60a and the power receiving coils 65 of the electric apparatus 200 are positioned at respective positions corresponding to the coils positioned under the top plate 4 of the main body 100.

For example, the magnetic member 60a and the power receiving coils 65 are disposed at respective positions at which the positional relationship between the magnetic member 60a and the power receiving coils 65 corresponds to the positional relationship between the inner circumferential coil 11a and the outer circumferential coils 11b and 11c of the first heating unit 11. One example thereof will be described with reference to FIG. 6.

Figure 6:
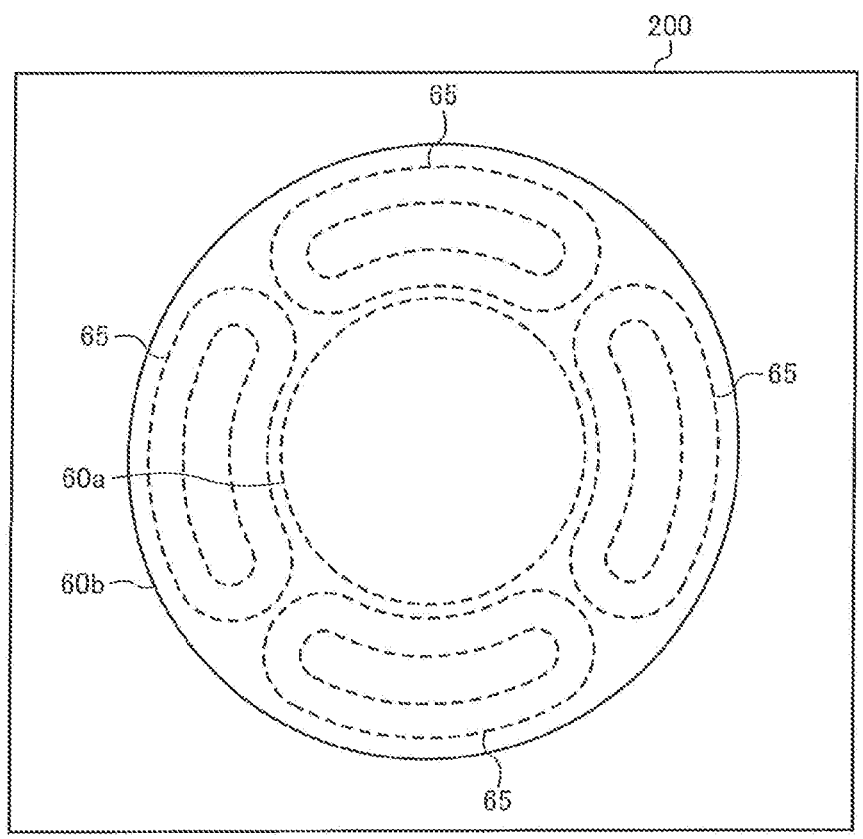
FIG. 6 is a top view schematically illustrating a configuration of the electric apparatus of the heating cooker system according to Embodiment 1.

FIG. 6 is a top view schematically illustrating a configuration of the electric apparatus of the heating cooker system according to Embodiment 1.

As illustrated in FIG. 6, in the electric apparatus 200, the magnetic member 60a and the power receiving coils 65 are positioned under the cooking tray 60b having a circular shape, for example.

The magnetic member 60a is formed into a disc shape having an outer diameter substantially the same as the outer diameter of the inner circumferential coil 11a of the main body 100. That is, in a state in which the electric apparatus 200 is placed on the top plate 4 of the main body 100, the magnetic member 60a of the electric apparatus 200 is positioned to be superimposed on the inner circumferential coil 11a of the main body 100 in the vertical direction. Further, the magnetic member 60a has a shape not superimposed on the outer circumferential coils 11b and 11c in the vertical direction.

Four power receiving coils 65 are provided around the magnetic member 60a to correspond to the outer circumferential coils 11b and 11c of the main body 100. Each of the four power receiving coils 65 has a shape substantially the same as the shape of each of the outer circumferential coils 11b and 11c of the main body 100. That is, each of the four power receiving coils 65 has a substantially quarter arcuate shape (banana or cucumber shape) in a plan view, and is formed of a conductive wire made of a given metal (copper or aluminum, for example) coated with an insulating film and wound along the quarter arcuate shape of the power receiving coil 65.

It is desirable that the power receiving coils 65 of the electric apparatus 200 are positioned to be only superimposed on the outer circumferential coils 11b and 11c of the main body 100 and not to be superimposed on the inner circumferential coil 11a of the main body 100 in the vertical direction.

The positions of the power receiving coils 65 are not limited to the positions illustrated in FIG. 6, and it suffices if the power receiving coils 65 are disposed at respective positions at least partially above the outer circumferential coils 11b and 11c when the magnetic member 60a is positioned above the inner circumferential coil 11a. Further, the number of the power receiving coils 65 is not limited to the above-described number, and it suffices if at least one power receiving coil 65 is provided. Further, a configuration provided with a plurality of power receiving coils 65 for one outer circumferential coil may be employed.

With the above-described configuration, when the electric apparatus 200 is placed on the top plate 4 of the main body 100, the magnetic member 60a and the inner circumferential coil 11a are positioned to be superimposed on each other in the vertical direction. Further, when a high-frequency current is supplied to the inner circumferential coil 11a from the drive circuit 50a, the magnetic member 60a is inductively heated by a high-frequency magnetic flux (high-frequency magnetic field) produced by the inner circumferential coil 11a. The heat generated by the magnetic member 60a is transferred to the cooking tray 60b, which is thermally coupled with the magnetic member 60a. Thereby, the food 70 placed on the cooking tray 60b is heated from below.

Further, when the electric apparatus 200 is placed on the top plate 4 of the main body 100, the power receiving coils 65 and the outer circumferential coils 11b and 11c are positioned to be superimposed on each other in the vertical direction. Further, when high-frequency currents are supplied to the outer circumferential coils 11b and 11c from the drive circuits 50b and 50c, respectively, high-frequency magnetic fluxes (high-frequency magnetic fields) are produced by the outer circumferential coils 11b and 11c. With the high-frequency magnetic fluxes (high-frequency magnetic fields) produced by the outer circumferential coils 11b and 11c, electric power (electromotive force) due to electromagnetic induction is generated in the power receiving coils 65 of the electric apparatus 200. The electric power generated in the power receiving coils 65 is then supplied to the upper heater 61. Thereby, the upper heater 61 generates heat, and the food 70 placed on the cooking tray 60b is heated from above by thermal radiation.

As described above, the inner circumferential coil 11a of the main body 100 is used as an inductive heating coil for heating the magnetic member 60a of the electric apparatus 200. Further, the outer circumferential coils 11b and 11c of the main body 100 are used as power feeding coils for performing non-contact power transmission to the upper heater 61 of the electric apparatus 200.

The high-frequency current supplied to the inner circumferential coil 11a from the drive circuit 50a corresponds to a "first high-frequency current" of the present invention.

Further, the high-frequency magnetic flux (high-frequency magnetic field) produced by the inner circumferential coil 11a corresponds to a "first high-frequency magnetic field" of the present invention.

The high-frequency current supplied to the outer circumferential coils 11b and 11c from the drive circuits 50b and 50c corresponds to a "second high-frequency current" of the present invention.

Further, the high-frequency magnetic flux (high-frequency magnetic field) produced by the outer circumferential coils 11b and 11c corresponds to a "second high-frequency magnetic field" of the present invention.

Although not illustrated in FIGS. 5 and 6, it is desirable to provide ferrite on lower surfaces of the inner circumferential coil 11a and the outer circumferential coils 11b and 11c of the main body 100 as a magnetic member. It is also desirable to similarly provide ferrite on upper surfaces of the power receiving coils 65 of the electric apparatus 200.

Providing ferrite to the outer circumferential coils 11b and 11c used as the power feeding coils facilitates interlinkage of the high-frequency magnetic fluxes, thereby reducing magnetic flux leakage. It is thereby possible to feed the high-frequency power to the power receiving coils 65 more efficiently, thereby enabling an increase in power supply conversion efficiency and a reduction in loss.

Further, if ferrite on the lower surface of the inner circumferential coil 11a and ferrite on upper surfaces of the outer circumferential coils 11b and 11c are separately provided, interference between the high-frequency magnetic flux from the inner circumferential coil 11a and the high-frequency magnetic fluxes produced by the outer circumferential coils 11b and 11c is reduced. This reduces loss in the non-contact power transmission using the outer circumferential coils 11b and 11c as the power feeding coils, thereby enabling an increase in power transmission efficiency.

The inner circumferential coil 11a corresponds to a "first coil" of the present invention.

Further, the inverter circuit 23 of the drive circuit 50a corresponds to a "first inverter circuit" of the present invention, and may include the direct-current power supply circuit 22 of the drive circuit 50a.

Further, each of the outer circumferential coils 11b and 11c corresponds to a "second coil" of the present invention.

Further, the inverter circuit 23 of the drive circuits 50b and 50c corresponds to a "second inverter circuit" of the present invention, and may include the direct-current power supply circuit 22 of the drive circuits 50b and 50c, Further, the magnetic member 60*a* corresponds to a "first heating element" of the present invention.

Further, the upper heater 61 corresponds to a "second heating element" of the present invention.

Further, the control unit 45 corresponds to a "controller" of the present invention.

Further, the first transmitting and receiving unit 30*a* corresponds to a "receiving device" of the present invention.

Further, the second transmitting and receiving unit 30*b* corresponds to a "transmitting device" of the present invention.

(Operation)

An operation of the inductive heating cooker of Embodiment 1 will now be described.

A user places the food 70, such as fish, for example, on the cooking tray 60*b* in the electric apparatus 200. The user places the electric apparatus 200 on one of the heating areas of the top plate 4 of the main body 100. The following description will be given of a case in which the electric apparatus 200 is placed on the first heating area 1 (the first heating unit 11).

The user issues an instruction to start cooking (input heating power) with the display-and-operation unit 43. The display-and-operation unit 43 is installed with a dedicated mode (menu) for operating the electric apparatus 200, and selecting the dedicated mode enables easy cooking.

When the instruction to start cooking is issued, the control unit 45 of the main body 100 performs a heating operation of controlling the drive circuit 50*a* in accordance with the heating power for inductive heating, to thereby supply high-frequency power to the inner circumferential coil 11*a*. Thereby, the magnetic member 60*a* positioned on the lower surface of the cooking tray 60*b* of the electric apparatus 200 is inductively heated. Then, the heat generated in the magnetic member 60*a* by the inductive heating is transferred to the non-magnetic cooking tray 60*b*, and the food 70 placed on the upper surface of the cooking tray 60*b* is directly heated from below.

At the same time, the control unit 45 of the main body 100 performs a power transmitting operation of controlling the drive circuits 50*b* and 50*c* in accordance with the electric power to be transmitted to the power receiving coils 65, to thereby supply high-frequency power to the outer circumferential coils 11*b* and 11*c*. Thereby, the high-frequency power supplied by the outer circumferential coils 11*b* and 11*c* is received by the power receiving coils 65 positioned on the lower surface of the electric apparatus 200. The received power is supplied to the upper heater 61, and the upper heater 61 generates heat. Then, the upper heater 61 heats, from above, the food 70 placed on the upper surface of the cooking tray 60*b* by thermal radiation.

During the above-described heating operation, the control unit 45 may control the drive circuits 50*a*, 50*b*, and 50*c* in accordance with the temperature detected by the temperature sensor 62.

For example, the control unit 45 may acquire the information of the temperature detected by the temperature sensor 62 of the electric apparatus 200 via the first transmitting and receiving unit 30*a*. Then, the control unit 45 may control the driving of the drive circuits 50*a*, 50*b*, and 50*c* in accordance with a temperature such as a set temperature set with the display-and-operation unit 43 or a temperature preset based on the cooking menu to adjust the temperature in the heating chamber 210 of the electric apparatus 200 to a desired temperature, to thereby control the heat generation amount (heating power) of each of the magnetic member 60*a* and the upper heater 61.

A plurality of temperature sensors 62 may be provided in the vertical direction in the heating chamber 210. In this case, in accordance with the temperature detected by one of the temperature sensors 62 provided on the lower side, the control unit 45 controls the heating power for inductively heating the magnetic member 60*a* (the electric power to be supplied to the inner circumferential coil 11*a*). Further, in accordance with the temperature detected by one of the temperature sensors 62 provided on the upper side, the control unit 45 controls the heating power of the upper heater 61 (the electric power to be supplied to the outer circumferential coils 11*b* and 11*c*).

As described above, in Embodiment 1, the main body 100 of the inductive heating cooker includes the drive circuit 50*a* configured to supply a high-frequency current to the inner circumferential coil 11*a* and the drive circuits 50*b* and 50*c* provided independently of the drive circuit 50*a* and configured to supply a high-frequency current to the outer circumferential coils 11*b* and 11*c*, respectively. Further, the electric apparatus 200 of the inductive heating cooker includes the magnetic member 60*a* configured to be inductively heated by the inner circumferential coil 11*a*, the power receiving coils 65 configured to receive electric power from the outer circumferential coils 11*b* and 11*c*, and the upper heater 61 configured to generate heat with the electric power received by the power receiving coils 65.

Therefore, heating through inductive heating and heating through non-contact power transmission are simultaneously executable. Further, the heating through inductive heating and the heating through non-contact power transmission are independently controllable. Accordingly, it is possible to obtain an inductive heating cooker capable of nicely cooking food in a short time.

That is, with the drive circuit 50*a* and the drive circuits 50*b* and 50*c* provided independently of each other, it is possible to independently control upper heating by the upper heater 61 and lower heating with the heat from the magnetic member 60*a*, and thus to obtain an inductive heating cooker capable of nicely cooking food in a short time.

Further, the temperature sensor 62 configured to detect the temperature in the heating chamber 210 of the electric apparatus 200 and the second transmitting and receiving unit 30*b* configured to transmit the information of the detected temperature are provided. The control unit 45 acquires the information of the temperature detected by the temperature sensor 62 via the first transmitting and receiving unit 30*a*. Then, in accordance with the temperature detected by the temperature sensor 62, the control unit 45 controls the driving of the drive circuit 50*a* and the driving of the drive circuits 50*b* and 50*c*.

The control unit 45 is therefore capable of independently controlling the heating through inductive heating and the heating through non-contact power transmission in accordance with the temperature detected by the temperature sensor 62. Accordingly, it is possible to finely control the internal temperature of the electric apparatus 200 and the temperature of a cooking plate, thereby enabling easy cooking with few failures.

In Embodiment 1, a description has been given of the outer circumferential coils 11*b* and 11*c*, which include four coils. However, the number of the coils is not limited thereto. Further, although the four coils are driven by the two drive circuits 50, the combinations of the coils and the drive circuits (inverter circuits) are not particularly limited. Even if the four coils are independently driven, effects similar to those described above are obtained.

Further, in Embodiment 1, a description has been given of a case in which the first heating unit 11 includes the inner circumferential coil 11a and the outer circumferential coils 11b and 11c positioned therearound. However, the present invention is not limited thereto. It suffices if the coil for inductively heating the magnetic member 60a of the electric apparatus 200 and the coils for transmitting electric power to the power receiving coils 65 of the electric apparatus 200 are driven by the separate drive circuits 50 (inverter circuits).

Further, in Embodiment 1, a description has been given of a case in which the electric apparatus 200 is placed on the top plate 4 of the main body 100. However, the inner circumferential coil 11a and the outer circumferential coils 11b and 11c may be used as inductive heating coils to inductively heat the entire surface of the heating area on which the heating target 5, such as a pot, is placed. Thus inductively heating the entire surface of the heating area enables an increase in area of an inductively heated area, making it possible to obtain an inductive heating cooker capable of sufficiently heating even a large pot.

Further, when inductively heating the placed heating target 5, such as a pot, it is possible to independently control the electric power to be input to the inner circumferential coil 11a and the electric power to be input to the outer circumferential coils 11b and 11c. It is therefore possible to change the inductively heated area by sequentially switching between supply of power to the inner circumferential coil 11a and supply of power to the outer circumferential coils 11b and 11c. Such control enables convective simmering when cooking food by simmering, making it possible to obtain an inductive heating cooker capable of nicely cooking food.

In Embodiment 1, a description has been given of the heating cooker system including the main body 100 of the inductive heating cooker and the electric apparatus 200. However, the present invention is not limited thereto, and the entire configuration of the electric apparatus 200 may be included in the main body 100 of the inductive heating cooker to omit the electric apparatus 200. Further, the configuration of the electric apparatus 200 may partially be included in the main body 100 of the inductive heating cooker.

Modified Example 1

A modified example of the power receiving coil 65 will be described.

Figure 7:
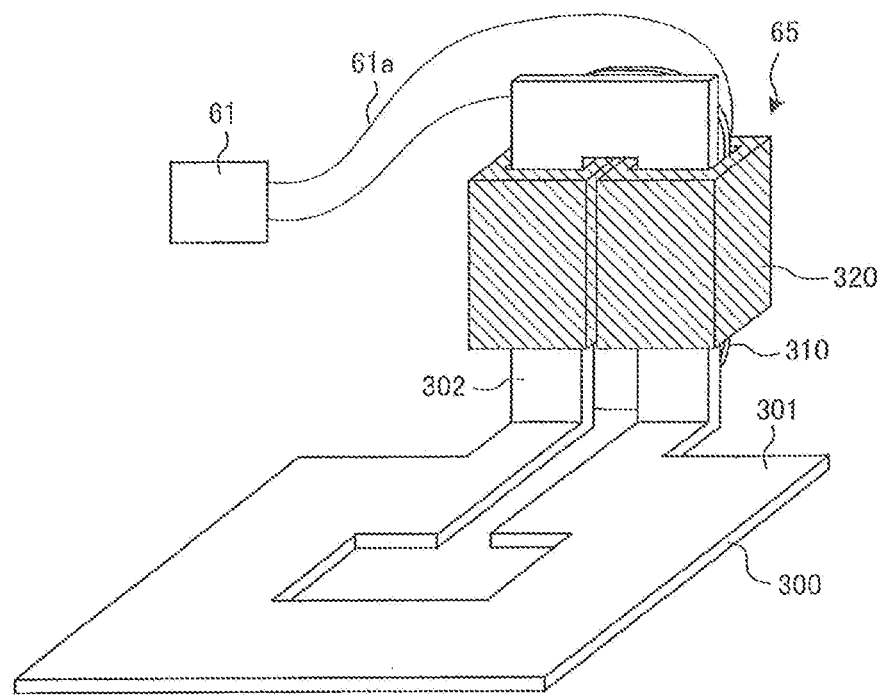
FIG. 7 is a diagram illustrating a modified example of a power receiving coil of the electric apparatus according to Embodiment 1.
Figure 8:
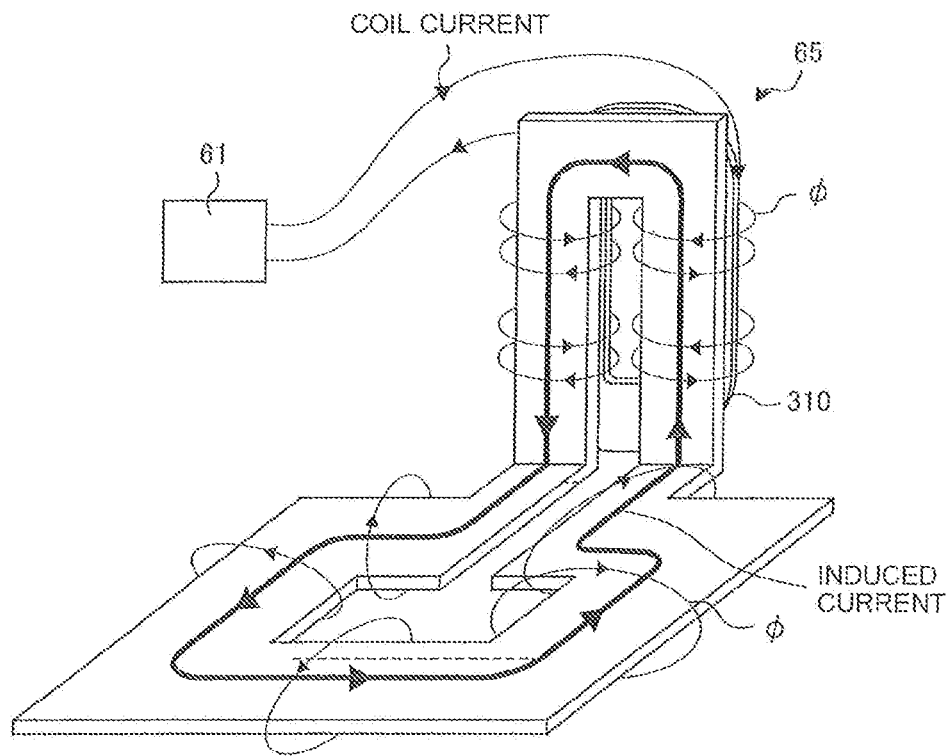
FIG. 8 is a diagram illustrating the modified example of the power receiving coil of the electric apparatus according to Embodiment 1.

FIGS. 7 and 8 are diagrams illustrating a modified example of the power receiving coil of the electric apparatus according to Embodiment 1.

The power receiving coil 65 in this modified example is formed of a loop-shaped conductor 300, a coil 310, and a magnetic member 320. Illustration of the magnetic member 320 is omitted in FIG. 8.

The loop-shaped conductor 300 is made of a conductive material such as a metal having a low electrical resistance, such as aluminum or copper. The loop-shaped conductor 300 is formed of an aluminum plate or a copper plate, for example, which is processed into a loop shape through processing such as cutting or pressing to form an electrically closed circuit. The loop-shaped conductor 300 is thereafter bent in a perpendicular direction at an intermediate point in the longitudinal direction thereof to form an L shape. The loop-shaped conductor 300 includes a horizontal portion 301 that is positioned on the bottom surface of the electric apparatus 200 and a vertical portion 302 that extends upward from an end of the horizontal portion 301.

A back surface of the vertical portion 302 of the loop-shaped conductor 300 is provided with the coil 310 formed of a conductive wire wound into a flat plate shape. As illustrated in the drawings, a coil bundle portion (a linear portion) forming a part of the coil 310 is positioned on a back surface of one of divided portions of the vertical portion 302 of the loop-shaped conductor 300. Further, another coil bundle portion (a linear portion) of the coil 310 is positioned on a back surface of the other divided portion of the vertical portion 302 of the loop-shaped conductor 300.

The magnetic member 320 is made of ferrite, for example, and is positioned to form a magnetic circuit in which a high-frequency magnetic flux produced when a high-frequency current is caused to flow through the coil 310 interlinks with the loop-shaped conductor 300.

An operation will now be described.

Similarly as in the above description, when a high-frequency magnetic flux (high-frequency magnetic field) is produced by the corresponding one of the outer circumferential coils 11b and 11c, electric power (electromotive force) due to electromagnetic induction is generated in the loop-shaped conductor 300. With the electromagnetic induction, therefore, an induced current flows through the loop-shaped conductor 300. Further, owing to the low electrical resistance of the loop-shaped conductor 300, a high induced current flows through the loop-shaped conductor 300.

When a high-frequency induced current flows through the loop-shaped conductor 300, a high-frequency magnetic flux $\varphi$ is produced around the loop-shaped conductor 300. In the vertical portion 302, the high-frequency magnetic flux $\varphi$ mostly passes through the magnetic member 320 having a low magnetic resistance. In the vertical portion 302, the magnetic circuit formed of the loop-shaped conductor 300 and the magnetic member 320 is positioned to make interlinkage with the coil 310. Thus, the high-frequency magnetic flux $\varphi$ interlinks with the coil 310. Consequently, an induced current flows through the coil 310 owing to electromagnetic induction. The induced current generated in the coil 310 is supplied to the upper heater 61.

That is, the power receiving coil 65 illustrated in FIGS. 7 and 8 operates on the same operating principle as that of a transformer. If the coil 310 is assumed to be primary winding, the number of turns of which is N, the loop-shaped conductor 300 is secondary winding, the number of turns of which is 1. Thus, the power receiving coil 65 is assumable as a transformer in which N is 1. Accordingly, a current having the same frequency as that of the induced current induced by the loop-shaped conductor 300 flows through the coil 310.

As described above, the loop-shaped conductor 300 of the power receiving coil 65 is formed of a metal plate made of copper (not coated with an insulating film).

Therefore, the heat resistance of the power receiving coil 65 per se is improved, making it possible to ensure the heat resistance of the power receiving coil 65 even if the temperature in the electric apparatus 200 is increased to a high temperature. Accordingly, it is possible to realize a high-temperature cooking menu, and thus to obtain the electric apparatus 200 with an increase in the number of cooking menus.

Further, since the power receiving coil 65 is improved in heat resistance and formed of a thin metal plate, it is possible to reduce the distance (interval) between the power receiving coil 65 and the cooking tray 60b of the cooking tray 60b. Accordingly, it is possible to reduce the size of the electric apparatus 200, and thus to obtain the electric apparatus 200 with a reduction in weight and price.

Further, the coil 310 is positioned on the vertical portion 302 of the loop-shaped conductor 300, and is connected to the upper heater 61 by the wires 61a (conductive wires). This makes it easy to dispose the coil 310 and the wires 61a at respective positions to which the heat from the heating chamber 210 is unlikely to be transferred. Thus, a configuration promoting heat resistance is obtainable.

Modified Example 2

Another configuration example of the drive circuit 50 will now be described.

Figure 9:
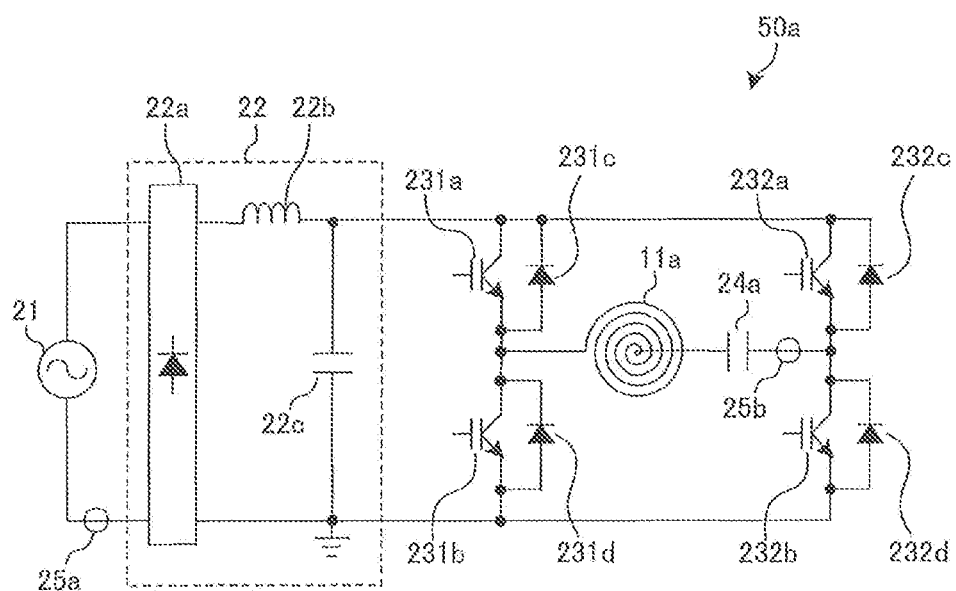
FIG. 9 is a diagram illustrating another one of the drive circuits of the inductive heating cooker according to Embodiment 1.

FIG. 9 is a diagram illustrating another one of the drive circuits of the inductive heating cooker according to Embodiment 1.

The drive circuit 50a illustrated in FIG. 9 is formed of a so-called full-bridge inverter, in which IGBTs 232a and 232b serving as switching elements and diodes 232c and 232d serving as flywheel diodes are additionally connected to the inverter circuit 23 in FIG. 4. The other configurations are similar to those in FIG. 4, and identical parts are assigned with identical reference signs.

The control unit 45 outputs a drive signal for driving switching elements (IGBTs 231a, 231b, 232a, and 232b) of the inverter circuit 23, and performs control similarly as in the above-described operation such that the electric power input to the inner circumferential coil 11a equals the electric power set for the heating operation. Effects similar to those described above are also obtainable with this configuration.

FIG. 9 illustrates an example of the drive circuit 50a that drives the inner circumferential coil 11a. However, the configuration is not limited thereto, and is also applicable to the other drive circuits.

Modified Example 3

Further, another configuration example of the drive circuits 50 will be described.

Figure 10:
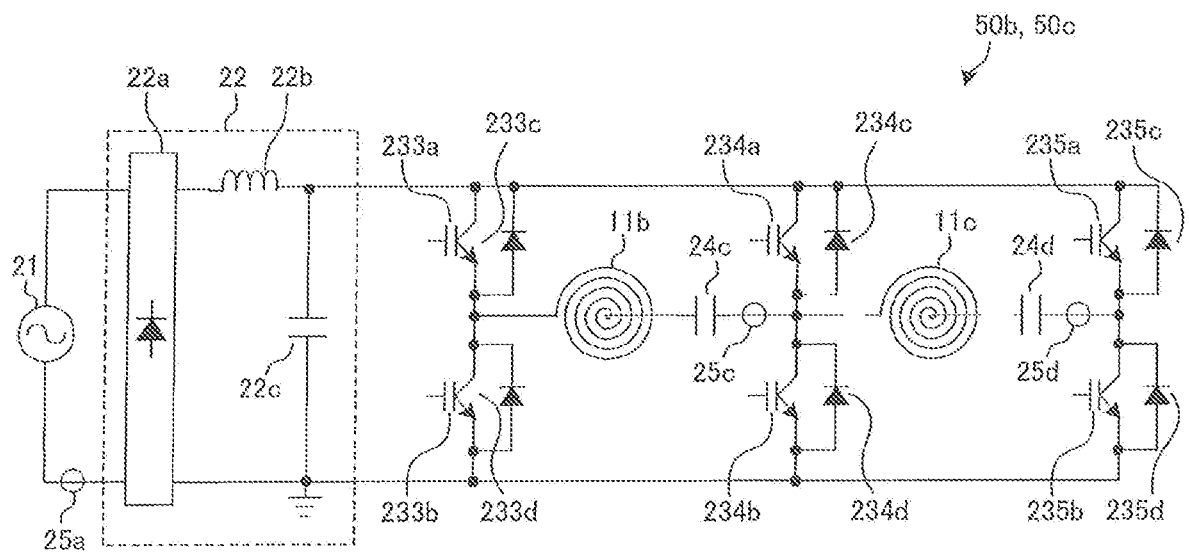
FIG. 10 is a diagram illustrating the other ones of the drive circuits of the inductive heating cooker according to Embodiment 1.

FIG. 10 is a diagram illustrating the other ones of the drive circuits of the inductive heating cooker according to Embodiment 1.

In the example illustrated in FIG. 10, the drive circuit 50b that drives the outer circumferential coil 11b and the drive circuit 50c that drives the outer circumferential coil 11c are formed of a full-bridge inverter circuit in which one of arms forming a full bridge is used as a shared arm.

As illustrated in FIG. 10, the drive circuits 50b and 50c are formed of a full-bridge inverter similarly as in FIG. 9. The drive circuits 50b and 50c are configured such that an arm formed of two IBGTs 234a and 234b is used as a shared arm to perform the drive control of the outer circumferential coil 11b (a power feeding coil) with IGBTs 233a and 233b and the shared arm, and perform the drive control of the outer circumferential coil 11c (a power feeding coil) with IGBTs 235a and 235b and the shared arm.

This configuration is also capable of performing the drive control of the outer circumferential coil 11b and the drive control of the outer circumferential coil 11c, respectively, and obtaining effects similar to those described above.

Modified Example 4

Another configuration example of the coils forming the first heating unit 11 will now be described.

Figure 11:
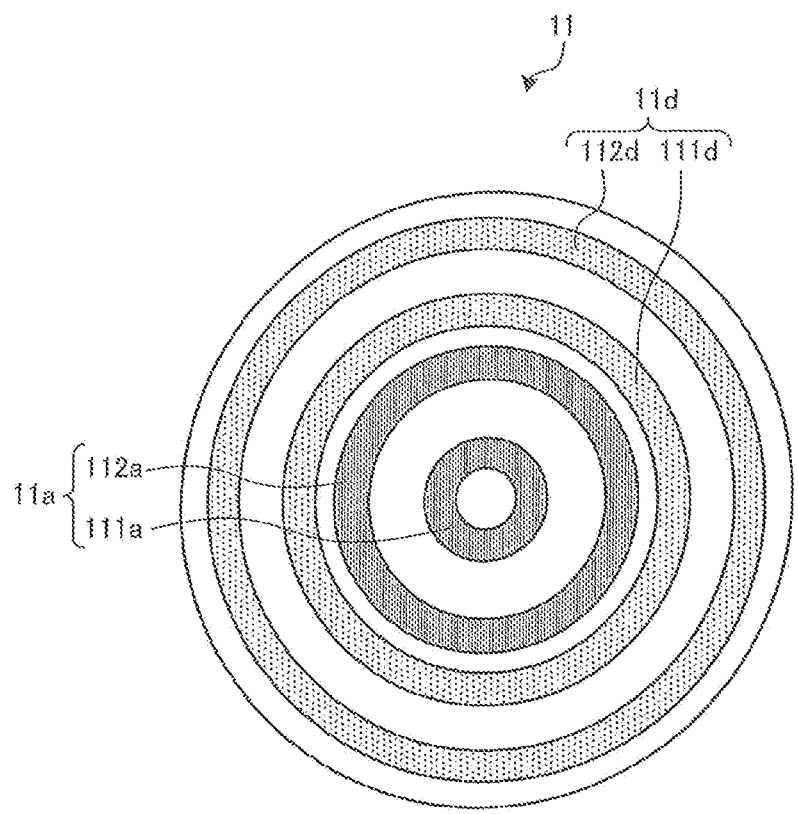
FIG. 11 is a diagram illustrating another first heating unit of the inductive heating cooker according to Embodiment 1.

FIG. 11 is a diagram illustrating another first heating unit of the inductive heating cooker according to Embodiment 1.

The first heating unit 11 illustrated in FIG. 11 is formed of the inner circumferential coil 11a positioned at the center of the heating area and an outer circumferential coil 11d positioned substantially concentrically with the inner circumferential coil 11a.

Similarly as in the above description, the inner circumferential coil 11a includes the inner circumferential inner coil 111a and the inner circumferential outer coil 112a, which are connected in series and subjected to the drive control of the drive circuit 50a.

The outer circumferential coil 11d includes an outer circumferential inner coil 111d and an outer circumferential outer coil 112d, which are formed concentrically with the inner circumferential coil 11a. The outer circumferential inner coil 111d and the outer circumferential outer coil 112d are connected in series and subjected to drive control of a drive circuit 50d. The configuration of the drive circuit 50d is similar to that of the drive circuit 50a described above.

In this configuration example, the power receiving coils 65 of the electric apparatus 200 are formed concentrically with the center of the magnetic member 60a to correspond to the shape of the outer circumferential coil 11d.

Also in this configuration, the inner circumferential coil 11a of the main body 100 is used as an inductive heating coil for heating the magnetic member 60a of the electric apparatus 200. Further, the outer circumferential coil 11d is used as a power feeding coil for performing non-contact power transmission to the upper heater 61 of the electric apparatus 200. Thereby, effects similar to those described above are obtainable.

Further, according to the present configuration, the coil configuration is simpler than the above-described coil configuration in FIG. 2. Therefore, effects similar to those described above are obtainable with an inexpensive configuration.

Embodiment 2

Figure 12:
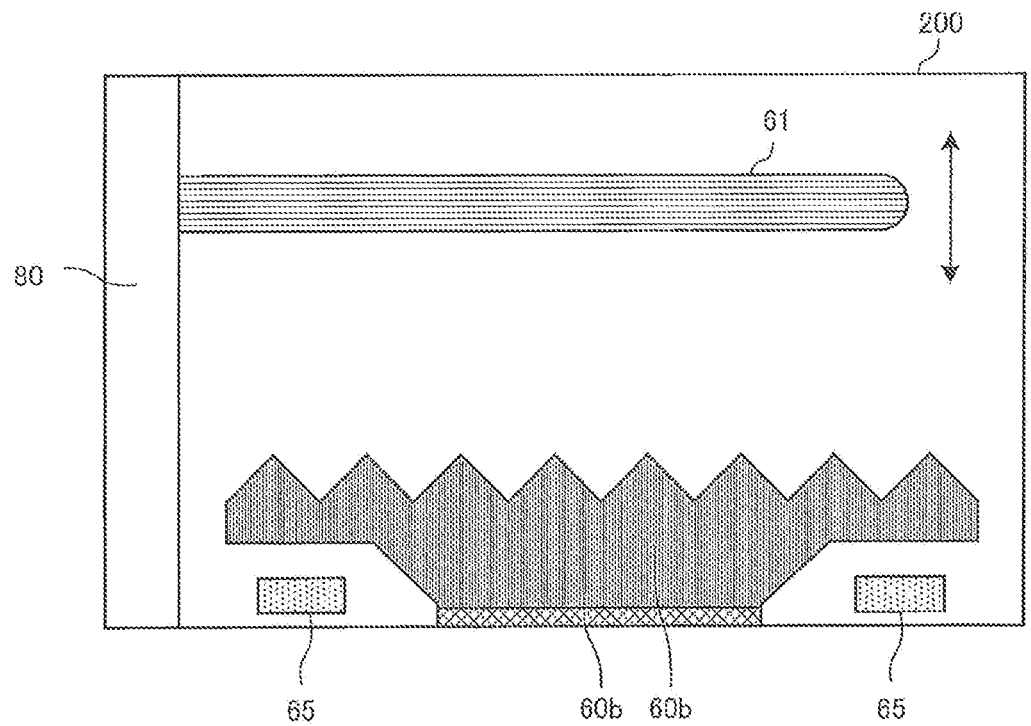
FIG. 12 is a block diagram illustrating a configuration of an electric apparatus of a heating cooker system according to Embodiment 2.

FIG. 12 is a block diagram illustrating a configuration of an electric apparatus of a heating cooker system according to Embodiment 2.

FIG. 12 schematically illustrates a longitudinal section of the electric apparatus 200 viewed from a side surface side thereof, and the configuration of the electric apparatus 200 is partially omitted.

As illustrated in FIG. 12, the electric apparatus 200 of Embodiment 2 includes a drive mechanism 80 that moves the upper heater 61 in the vertical direction.

The drive mechanism 80 is provided on a wall surface on a back surface side of the housing, and is manually operated by the user, for example, to move the upper heater 61 in the vertical direction. For instance, the upper heater 61 is fixed to a rack formed of a flat plate-shaped rod cut to have teeth, and a pinion engaging with the rack is rotated to move the upper heater 61 in the vertical direction.

The configuration of the drive mechanism 80 is not limited to the one based on the manual operation. For example, the drive mechanism 80 may be configured to move the upper heater 61 with the drive force of a motor. Further, the electric power received by the power receiving coils 65 may be used as electric drive power of the motor of the drive mechanism 80. Further, the electric apparatus 200 may be provided with a storage battery, and the electric power received by the power receiving coils 65 may be rectified and thereafter stored in the storage battery to be used as the electric drive power of the drive mechanism 80.

As described above, in Embodiment 2, the electric apparatus 200 includes the drive mechanism 80 that moves the upper heater 61 in the vertical direction.

It is therefore possible to change the position (height) of the upper heater 61 in accordance with factors such as the height, thickness, and size of the food 70. Accordingly, it is possible to change the amount of radiant heat from the upper surface of the food 70, thereby enabling heating control according to cooking, cooking in a short time, and an increase in types and ranges of cooking, such as browning the cooked food.

Embodiment 3

Figure 13:
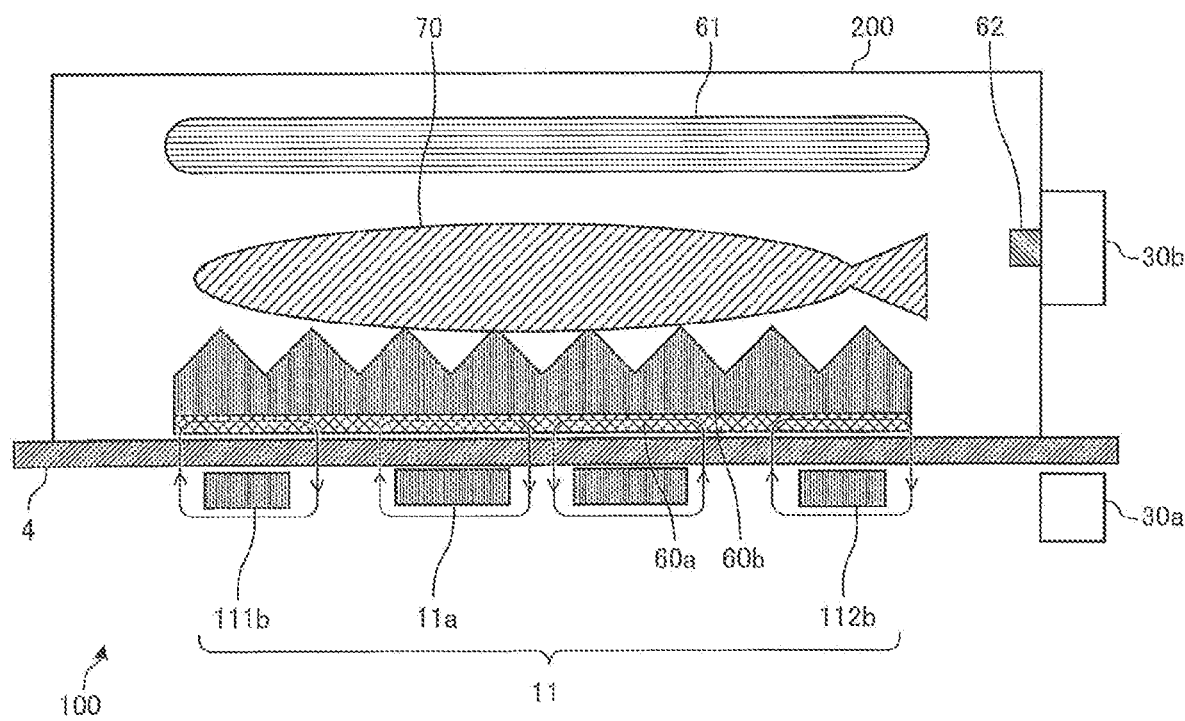
FIG. 13 is a block diagram illustrating a configuration of an electric apparatus of a heating cooker system according to Embodiment 3.
Figure 14:
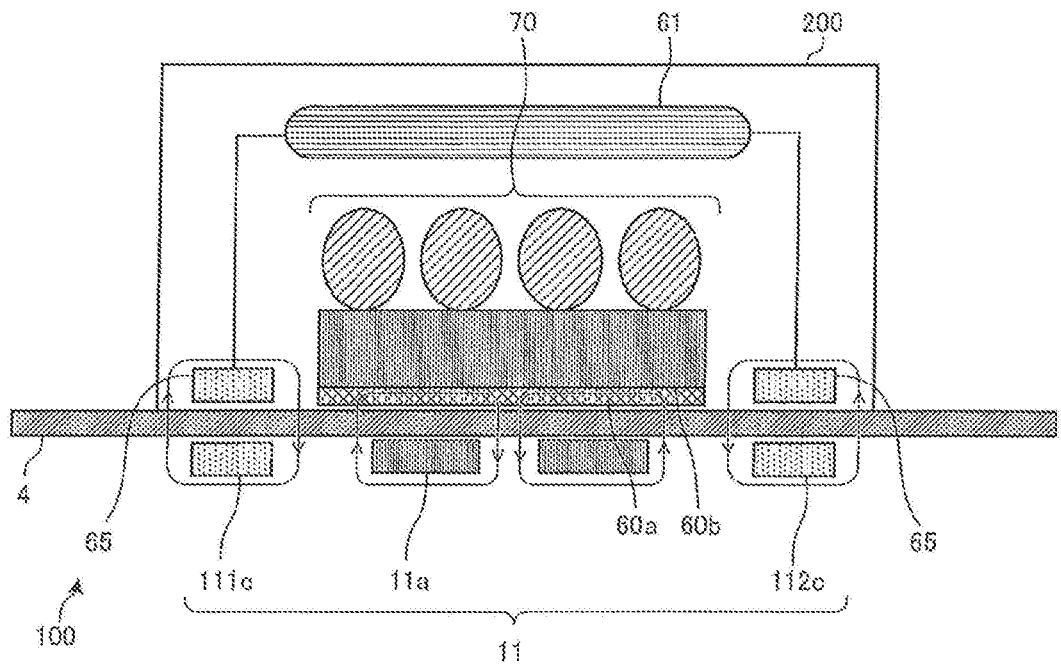
FIG. 14 is a block diagram illustrating the configuration of the electric apparatus of the heating cooker system according to Embodiment 3.

FIGS. 13 and 14 are block diagrams illustrating a configuration of an electric apparatus of a heating cooker system according to Embodiment 3.

Figure 15:
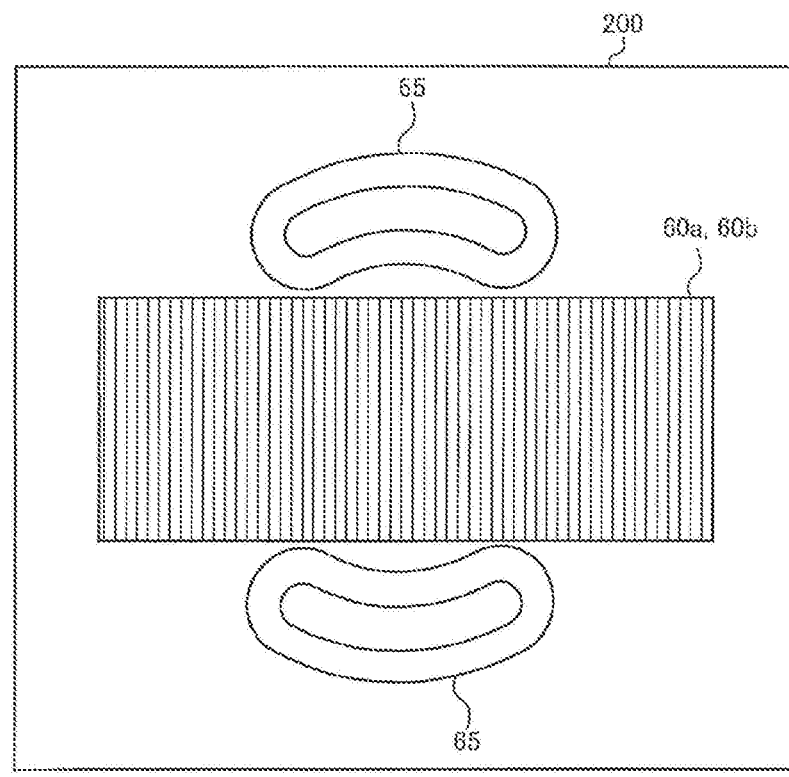
FIG. 15 is a top view schematically illustrating the configuration of the electric apparatus of the heating cooker system according to Embodiment 3.

FIG. 15 is a top view schematically illustrating the configuration of the electric apparatus of the heating cooker system according to Embodiment 3.

FIGS. 13 and 14 illustrate a state in which the electric apparatus 200 is placed on the top plate 4 of the main body 100. Further, FIG. 13 schematically illustrates a longitudinal section of the main body 100 and the electric apparatus 200 viewed from a front surface side thereof. Further, FIG. 14 schematically illustrates a longitudinal section of the main body 100 and the electric apparatus 200 viewed from a side surface side thereof.

The following description will focus on differences from Embodiment 1 described above.

As illustrated in FIGS. 13 to 15, each of the magnetic member 60a and the cooking tray 60b in Embodiment 3 is formed into a rectangular shape in a top view. The magnetic member 60a and the cooking tray 60b are formed such that each of long sides thereof has a length equal to or greater than the width of the corresponding heating area, for example, and that each of short sides thereof has a length substantially equal to the width (outer diameter) of the inner circumferential coil 11a.

For example, when the electric apparatus 200 is placed on the top plate 4 such that the long sides of the magnetic member 60a and the cooking tray 60b are oriented along the lateral direction, left end portions of the magnetic member 60a and the cooking tray 60b are positioned outside an end portion of the outer circumferential left coil 111b of the main body 100, and that right end portions of the magnetic member 60a and the cooking tray 60b are positioned outside the outer circumferential right coil 112b of the main body 100, as illustrated in FIGS. 13 and 14. Further, the width in the anteroposterior direction of each of the magnetic member 60a and the cooking tray 60b is substantially equal to the width of the inner circumferential coil 11a. That is, each of the magnetic member 60a and the cooking tray 60b has a shape that is not superimposed on the outer circumferential upper coil 111c and the outer circumferential lower coil 112c.

The power receiving coils 65 of Embodiment 3 are positioned to flank the two long sides of each of the magnetic member 60a and the cooking tray 60b, for example. The power receiving coils 65 are two power receiving coils 65 provided to correspond to the outer circumferential upper coil 111c and the outer circumferential lower coil 112c of the main body 100. Each of the two power receiving coils 65 has a substantially quarter arcuate shape (banana or cucumber shape) in a plan view, and is formed of a conductive wire made of a given metal (copper or aluminum, for example) coated with an insulating film and wound along the quarter arcuate shape of the power receiving coil 65.

Figure 16:
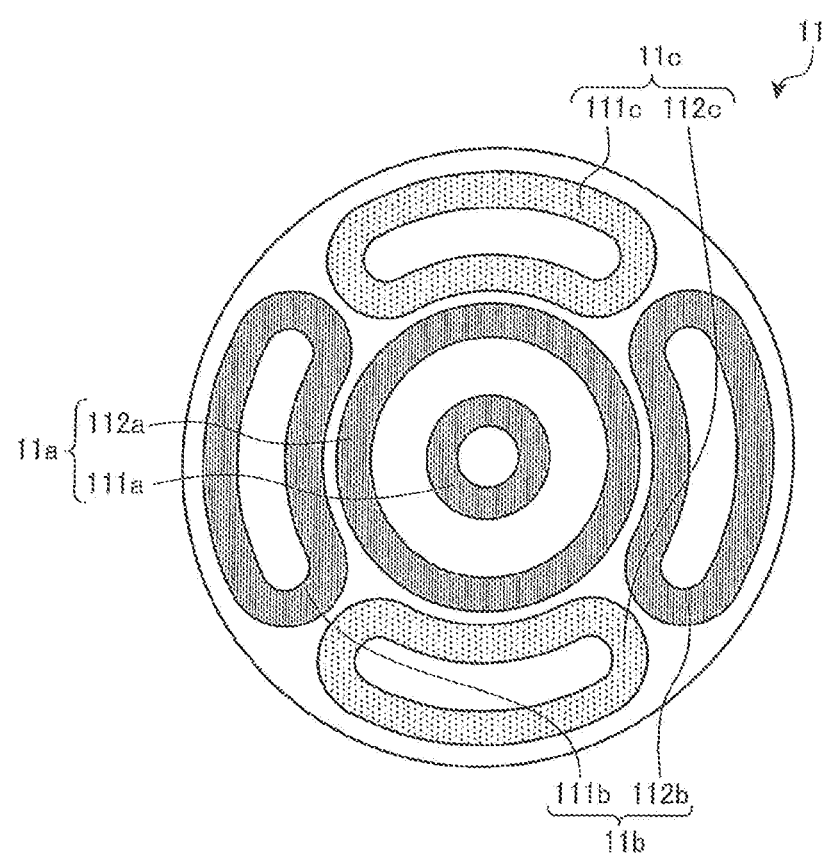
FIG. 16 is a diagram illustrating a first heating unit of an inductive heating cooker according to Embodiment 3.

FIG. 16 is a diagram illustrating a first heating unit of an inductive heating cooker according to Embodiment 3.

In FIG. 16, the configuration of the first heating unit 11 is similar to that of Embodiment 1 described above, but the drive control of the first heating unit 11 by the control unit 45 is different from that of Embodiment 1.

That is, the control unit 45 performs a heating operation of controlling the drive circuit 50a that drives the inner circumferential coil 11a and the drive circuit 50b that drives the outer circumferential coil 11b (the outer circumferential left coil 111b and the outer circumferential right coil 112b) in accordance with the heating power for inductive heating, to thereby supply high-frequency power. Thereby, the magnetic member 60a positioned on the lower surface of the cooking tray 60b of the electric apparatus 200 is inductively heated. Then, the heat generated in the magnetic member 60a by the inductive heating is transferred to the non-magnetic cooking tray 60b, and the food 70 placed on the upper surface of the cooking tray 60b is directly heated from below.

At the same time, the control unit 45 performs a power transmitting operation of controlling the drive circuit 50c in accordance with the electric power to be transmitted to the corresponding power receiving coils 65, to thereby supply high-frequency power to the outer circumferential coil 11c (the outer circumferential upper coil 111c and the outer circumferential lower coil 112c). Thereby, the high-frequency power supplied by the outer circumferential coil 11c is received by the corresponding power receiving coils 65 positioned on the lower surface of the electric apparatus 200. The received power is supplied to the upper heater 61, and the upper heater 61 generates heat. The upper heater 61 then heats, from above, the food 70 placed on the upper surface of the cooking tray 60b by thermal radiation.

As described above, in Embodiment 3, the respective widths of the magnetic member 60a and the cooking tray 60b are increased to be greater than those in Embodiment 1 described above, and the magnetic member 60a is inductively heated by the inner circumferential coil 11a and the outer circumferential coil 11b. With an increase in the area of lower heating through inductive heating, therefore, it is possible to add appropriate browning to food from below. For example, even if the food 70 is of an elongated shape, such as fish, it is possible to place the food 70 on the cooking tray 60b and nicely cook the food 70, such as fish, by lower heating.

Herein, the power feeding coils for supplying electric power to the upper heater 61 of the electric apparatus 200 are the outer circumferential upper coil 111c and the outer circumferential lower coil 112c. As compared with the configuration in FIG. 4, the number of coils for supplying electric power to the power receiving coils 65 is reduced. To prevent a reduction in the electric power supplied to the upper heater 61, therefore, the electric power to be supplied to the outer circumferential upper coil 111c and the outer circumferential lower coil 112c is increased. Accordingly, it is possible to obtain the electric apparatus 200 capable of nicely cooking food in a short time without compromising the cooking time.

Further, if the drive mechanism 80 of Embodiment 2 described above is applied to move the upper heater 61 toward the food 70, it is possible to obtain the electric apparatus 200 capable of nicely cooking food in a short time without compromising the cooking time.

Embodiment 4

In Embodiment 4, a description will be given of an operation of detecting whether any of the magnetic member 60a and the power receiving coils 65 of the electric apparatus 200 is placed above the coils of the main body 100, and switching between the heating operation and the power transmitting operation in accordance with the result of the detection.

In Embodiment 4, the configuration of the main body 100 is similar to that of Embodiment 1 described above, and the configuration of the electric apparatus 200 is similar to that of one of Embodiments 1 to 3 described above.

When the user places the electric apparatus 200 on one of the heating areas and issues an instruction to start heating (input heating power) with the display-and-operation unit 43, the control unit 45 (a load determining unit) performs a load determining process.

The control unit 45 of Embodiment 4 includes the function of a "load determining unit" of the present invention.

Figure 17:
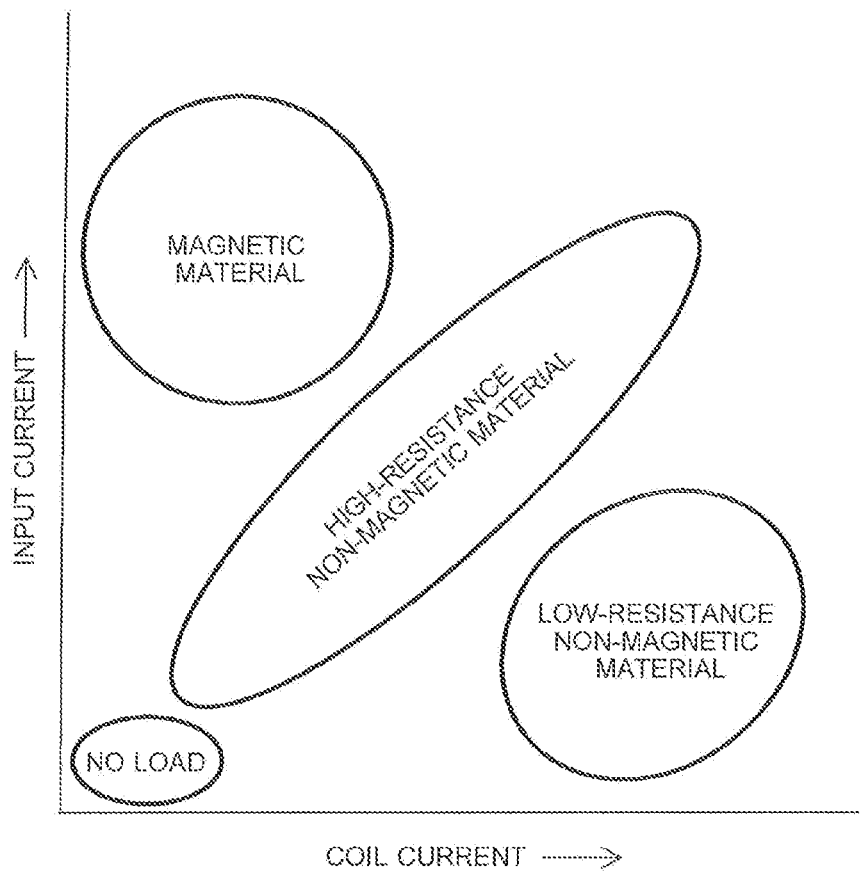
FIG. 17 is a load determining characteristic graph based on the relationship between a coil current and an input current in an inductive heating cooker according to Embodiment 4.

FIG. 17 is a load determining characteristic graph based on the relationship between a coil current and an input current in an inductive heating cooker according to Embodiment 4.

As illustrated in FIG. 17, the relationship between the coil current and the input current changes depending on the material of the load placed above the corresponding one of the coils (the inner circumferential coil 11a and the outer circumferential coils 11b and 11c) of the main body 100. The control unit 45 previously stores therein a load determining table, which is a table of the relationship between the coil current and the input current illustrated in FIG. 17. With the load determining table stored in the control unit 45, it is possible to configure the load determining unit with an inexpensive configuration.

In the load determining process, the control unit 45 drives the inverter circuit 23 of each of the drive circuits 50a to 50c with a specific drive signal for load determination, and detects the input current from the signal output from the input current detecting unit 25a. At the same time, the control unit 45 detects the coil current from the signal output from the coil current detecting unit 25b. The control unit 45 determines the material of the load placed above the corresponding coil from the detected coil current, the detected input current, and the load determining table representing the relationship of FIG. 17.

If the result of the load determination indicates that the material of the load is a magnetic material, the control unit 45 determines that the magnetic member 60a of the electric apparatus 200 is placed above the coil. Further, if the result of the load determination indicates that the material of the load is other than the magnetic material, the control unit 45 determines that one of the power receiving coils 65 is placed above the coil. Further, if the result of the load determination indicates that there is no load, the control unit 45 determines that none of the magnetic member 60a and the power receiving coils 65 is placed thereabove.

The control unit 45 then performs a heating operation of controlling the drive circuit 50 that drives the one of the inner circumferential coil 11a and the outer circumferential coils 11b and 11c determined to have the magnetic member 60a placed thereabove, to thereby supply high-frequency power according to the heating power for inductive heating.

At the same time, the control unit 45 performs a power transmitting operation of controlling the drive circuit 50 that drives the one of the inner circumferential coil 11a and the outer circumferential coils 11b and 11c determined to have one of the power receiving coils 65 placed thereabove, to thereby supply high-frequency power according to the electric power to be transmitted to the power receiving coil 65.

The control unit 45 stops the operation of the drive circuit 50 that drives the coil determined to have no load placed thereabove.

Subsequent operations are similar to those of Embodiment 1 described above.

As described above, in Embodiment 4, whether any of the magnetic member 60a and the power receiving coils 65 is placed above the coils is determined, and the heating operation or the power transmitting operation by the coils is performed in accordance with the result of the detection. Accordingly, it is possible to automatically perform an operation according to the configuration and arrangement of the magnetic member 60a and the power receiving coils 65 in the electric apparatus 200.

The above description has been given of a case in which the load determination is performed based on the correlation between the input current and the coil current. However, the present invention is not limited thereto, and may employ a given load determining process. For example, the frequency of the high-frequency current to be supplied to the coils may be continuously changed, and the load determination may be performed based on change characteristics of the input current during the change.

Embodiment 5

Figure 18:
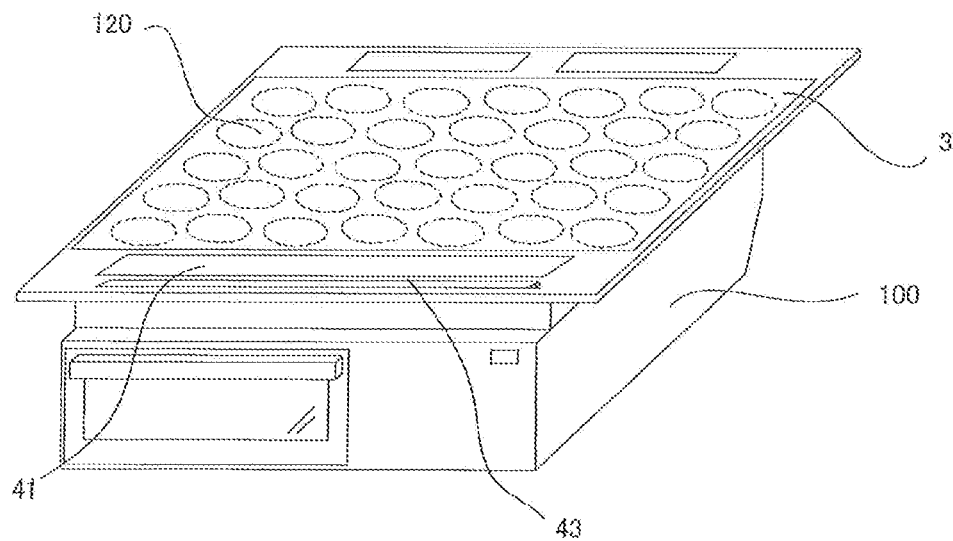
FIG. 18 is a perspective view illustrating a schematic configuration of a main body of an inductive heating cooker according to Embodiment 5.

FIG. 18 is a perspective view illustrating a schematic configuration of a main body of an inductive heating cooker according to Embodiment 5.

As illustrated in FIG. 18, in the main body 100 of the inductive heating cooker according to Embodiment 5, a plurality of coils 120 each having a relatively small size are positioned under the top plate 4 to be substantially evenly dispersed.

Each of the plurality of coils 120 is independently driven by a corresponding drive circuit 50. The configuration of the drive circuit 50 that drives the coil 120 is similar to the configuration of the drive circuit 50a of Embodiment 1 described above, for example.

Further, for each of the plurality of coils 120, the control unit 45 of Embodiment 5 performs load determination of the load placed thereabove. The load determining process is similar to that of Embodiment 4 described above.

In the configuration of Embodiment 5, the marks of the heating areas may not be provided on the top plate 4. The number of the coils 120 may be any number. Further, the layout of the coils 120 is not limited to the above-described one. The coils 120 may be arranged in a honeycomb pattern, or may include large coils 120 and small coils 120 mixedly arranged.

(Operation)

When the user places the electric apparatus 200 at a given position on the top plate 4 and issues an instruction to start heating (input heating power) with the display-and-operation unit 43, the control unit 45 (the load determining unit) performs a load determining process.

With an operation similar to that of Embodiment 4 described above, the control unit 45 performs, for each of the plurality of coils 120, the load determining process of determining the material of the load placed thereabove.

If the result of the load determination indicates that the material of the load is a magnetic material, the control unit 45 determines that the magnetic member 60a of the electric apparatus 200 is placed above the coil 120. Further, if the result of the load determination indicates that the material of the load is other than the magnetic material, the control unit 45 determines that one of the power receiving coil 65 is placed above the coil 120. Further, if the result of the load determination indicates that there is no load, the control unit 45 determines that none of the magnetic member 60*a* and the power receiving coils 65 is placed thereabove.

The control unit 45 then performs a heating operation of controlling the drive circuit 50 that drives the one of the plurality of coils 120 determined to have the magnetic member 60*a* placed thereabove, to thereby supply high-frequency power according to the heating power for inductive heating.

At the same time, the control unit 45 performs a power transmitting operation of controlling the drive circuit 50 that drives the one of the plurality of coils 120 determined to have one of the power receiving coils 65 placed thereabove, to thereby supply high-frequency power according to the electric power to be transmitted to the power receiving coil 65.

The control unit 45 stops the operation of the drive circuit 50 that drives the one of the plurality of coils 120 determined to have no load placed thereabove.

Subsequent operations are similar to those of Embodiment 1 described above.

As described above, Embodiment 5 includes the plurality of coils 120 positioned under the top plate 4 to be substantially evenly dispersed. Further, the control unit 45 detects, for each of the plurality of coils 120, whether any of the magnetic member 60*a* and the power receiving coils 65 is placed thereabove. The control unit 45 then performs the heating operation or the power transmitting operation by the coils 120 in accordance with the result of the detection. Accordingly, it is possible to automatically perform an operation according to the configuration and arrangement of the magnetic member 60*a* and the power receiving coils 65 in the electric apparatus 200.

Further, it is possible to place the electric apparatus 200 at a given position on the top plate 4, and thus to improve convenience.

REFERENCE SIGNS LIST

1 first heating area 2 second heating area 3 third heating area 4 top plate 5 heating target 11 the first heating unit 11*a* inner circumferential coil 11*b* outer circumferential coil 11*c* outer circumferential coil 11*d* outer circumferential coil 12 second heating unit 13 third heating unit 21 alternating-current power supply 22 direct-current power supply circuit 22*a* diode bridge 22*b* reactor 22*c* smoothing capacitor 23 inverter circuit 23*a*, 23*b* IGBT 23*c*, 23*d* diode 24*a*, 24*c*, 24*d* resonant capacitor 25*a* input current detecting unit 25*b*, 25*c*, 25*d* coil current detecting unit 30*a* first transmitting and receiving unit 30*b* second transmitting and receiving unit 40 operation unit 40*a* to 40*c* operation unit 41 display unit 41*a* to 41*c* display unit 42 reporting unit 43 display-and-operation unit 45 control unit 50 drive circuit 50*a* to 50*d* drive circuit 60*a* magnetic member 60*b* cooking tray 61 upper heater 61*a* wire 62 temperature sensor 65 power receiving coil cooked food 80 drive mechanism 100 main body 111*a* inner circumferential inner coil 111*b* outer circumferential left coil 111*c* outer circumferential upper coil 111*d* outer circumferential inner coil 112 outer circumferential lower coil 112*a* inner circumferential outer coil 112*b* outer circumferential right coil 112*c* outer circumferential lower coil 112*d* outer circumferential outer coil 120 coil 200 electric apparatus 210 heating chamber 231*a*, 231*b*, 232*a*, 232*b*, 233*a*, 233*b*, 234*a*, 234*b*, 235*a*, 235*b* IGBT 231*c*, 231*d*, 232*c*, 232*d*, 233*c*, 233*d*, 234*c*, 234*d*, 235*c*, 235*d* diode 300 loop-shaped conductor 301 horizontal portion 302 vertical portion 310 coil 320 magnetic member

The invention claimed is:

1. A heating cooker system comprising:
   a main body in which
      a first coil configured to produce a first high-frequency magnetic field by receiving supply of a first high-frequency current,
      a first inverter circuit configured to supply the first high-frequency current to the first coil,
      a second coil configured to produce a second high-frequency magnetic field by receiving supply of a second high-frequency current, and
      a second inverter circuit provided independently of the first inverter circuit and configured to supply the second high-frequency current to the second coil,
   are arranged below a top plate of the main body; and
   an electric apparatus including
      a first heating element positioned in reach of the first high-frequency magnetic field produced by the first coil across the top plate to be inductively heated by the first coil,
      a power receiving coil positioned in reach of the second high-frequency magnetic field produced by the second coil across the top plate to receive electric power from the second coil, and
      a second heating element configured to generate heat by the electric power received by the power receiving coil,
   wherein, in a top view, the first heating element is formed into a rectangular shape, the first coil has a width equal to each of short sides of the first heating element, and the second coil is positioned to flank two long sides of the first heating element.

2. The heating cooker system of claim 1, wherein the electric apparatus is detachably supported by the main body.

3. The heating cooker system of claim 1, comprising:
   a controller configured to control driving of the first inverter circuit in accordance with heating power for inductively heating the first heating element and control driving of the second inverter circuit in accordance with the electric power to be transmitted to the power receiving coil.

4. The heating cooker system of claim 3, wherein the electric apparatus includes
   a temperature sensor configured to detect a temperature in a heating chamber in which a heating target is stored, and
   a transmitting device configured to transmit information of the temperature detected by the temperature sensor,
   wherein the main body includes a receiving device configured to receive the information of the temperature transmitted from the transmitting device, and
   wherein the controller controls the driving of the first inverter circuit and the driving of the second inverter circuit in accordance with the information of the temperature.

5. The heating cooker system of claim 3, wherein the main body includes the top plate on which the electric apparatus is placed, and
   wherein the first coil is included in a plurality of coils provided under the top plate,
   wherein the controller detects whether the first heating element or the power receiving coil is placed above any of the plurality of coils, wherein the controller causes each of the plurality of coils on which the first heating element is detected to function as the first coil to inductively heat the first heating element, and wherein the controller causes each of the plurality of coils on which the power receiving coil is detected to function as the second coil to transmit the electric power to the power receiving coil.

6. The heating cooker system of claim 5, wherein the top plate is formed with a heating area indicating a position at which a heating target is to be placed, and the plurality of coils is provided for the heating area.

7. The heating cooker system of claim 6, wherein the plurality of coils includes an inner circumferential coil positioned at a center of the heating area, and an outer circumferential coil positioned around the inner circumferential coil.

8. The heating cooker system of claim 6, wherein the coils of the plurality of coils are different in diameter and concentrically positioned.

9. The heating cooker system of claim 5, wherein the coils of the plurality of coils are evenly dispersedly positioned under the top plate.

10. The heating cooker system of claim 1, wherein the electric apparatus includes a cooking tray on which a heating target is placed, wherein the first heating element is positioned on a bottom surface of the electric apparatus, wherein the cooking tray is positioned in contact with the first heating element, and wherein the second heating element is positioned above the cooking tray.

11. The heating cooker system of claim 1, wherein the electric apparatus includes a drive mechanism configured to move the second heating element in a vertical direction.

12. An inductive heating cooker comprising:

a first coil arranged below a top plate and configured to produce a first high-frequency magnetic field for inductively heating a rectangular-shaped area in a top view first heating element of an electric apparatus positioned on the top plate, the first coil being configured to produce the first high-frequency magnetic field by receiving supply of a first high-frequency current;

a first inverter circuit configured to supply the first high-frequency current to the first coil;

a second coil arranged below the top plate and configured to produce a second high-frequency magnetic field for transmitting power to a power receiving coil of an electric apparatus positioned over the top plate, the second coil being configured to produce the second high-frequency magnetic field by receiving supply of a second high-frequency current;

a second inverter circuit provided independently of the first inverter circuit and configured to supply the second high-frequency current to the second coil; and a controller configured to perform a heating operation of controlling driving of the first inverter circuit to inductively heat the first heating element, and a power transmitting operation of controlling driving of the second inverter circuit to transmit electric power to the power receiving coil, wherein, in the top view, the first coil has a width equal to each of short sides of the first heating element, and the second coil is positioned to flank two long sides of the first heating element.

13. An electric apparatus adapted to be positioned on a top plate of an inductive heating cooker, the electric apparatus comprising:

a heating chamber configured to store a heating target;

a cooking tray on which the heating target is placed;

a first heating element formed into a rectangular shape in a top view and positioned on a bottom surface of the heating chamber to be in contact with the cooking tray, wherein the first heating element is configured to be inductively heated by a first high-frequency magnetic field produced by a first coil, which receives supply of a first high-frequency current from a first inverter circuit of the inductive heating cooker;

a power receiving coil positioned to flank two long sides of the first heating element in a top view and configured to receive electric power through electromagnetic induction or magnetic field resonance from a second high-frequency magnetic field produced by a second coil which receives supply of a second high-frequency current from a second inverter circuit of the inductive heating cooker that is provided independently of the first inverter circuit;

a second heating element positioned above the cooking tray and configured to generate heat by the electric power received by the power receiving coil;

a temperature sensor configured to detect a temperature in the heating chamber; and a transmitting device configured to transmit information of the temperature detected by the temperature sensor to the inductive heating cooker.

* * * * *